United States Patent
Inoue et al.

(10) Patent No.: US 8,137,767 B2
(45) Date of Patent: Mar. 20, 2012

(54) ANTIREFLECTIVE FILM, POLARIZING PLATE AND IMAGE DISPLAY DEVICE

(75) Inventors: Rikio Inoue, Minami-Ashigara (JP); Hiroyuki Yoneyama, Minami-Ashigara (JP); Hiroyuki Mifune, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 1094 days.

(21) Appl. No.: 11/943,442

(22) Filed: Nov. 20, 2007

(65) Prior Publication Data

US 2008/0118669 A1 May 22, 2008

(30) Foreign Application Priority Data

Nov. 22, 2006 (JP) .............................. P2006-316146

(51) Int. Cl.
*G02B 1/10* (2006.01)
*G02B 1/11* (2006.01)

(52) U.S. Cl. .......... 428/1.4; 428/1.3; 428/446; 349/122; 349/137

(58) Field of Classification Search .................... 428/1.3, 428/1.4, 446; 349/122, 137; 359/586
See application file for complete search history.

(56) References Cited

U.S. PATENT DOCUMENTS

| | | | |
|---|---|---|---|
| 5,868,966 A * | 2/1999 | Wei et al. ...................... 252/500 |
| 7,683,109 B2 * | 3/2010 | Yoshida et al. ............... 523/523 |
| 7,829,884 B2 * | 11/2010 | Gelinck et al. ................. 257/40 |
| 7,862,886 B2 * | 1/2011 | Fukushige et al. ......... 428/313.9 |
| 8,007,878 B2 * | 8/2011 | Yoneyama et al. .......... 428/1.32 |
| 2003/0026960 A1 * | 2/2003 | Yamada et al. ............... 428/195 |
| 2003/0096102 A1 * | 5/2003 | Yoshihara et al. ............. 428/330 |
| 2005/0048228 A1 * | 3/2005 | Anderson et al. .......... 428/32.11 |
| 2005/0048406 A1 * | 3/2005 | Burberry et al. .............. 430/311 |
| 2005/0074603 A1 * | 4/2005 | Yuumoto et al. .............. 428/336 |
| 2005/0208230 A1 * | 9/2005 | Ikeda .............................. 428/1.1 |
| 2005/0239933 A1 * | 10/2005 | Lee et al. ....................... 524/261 |
| 2006/0066803 A1 * | 3/2006 | Aylward et al. ................ 349/158 |
| 2006/0160251 A1 * | 7/2006 | Dyreklev et al. ................. 438/3 |
| 2006/0232735 A1 * | 10/2006 | Hokazono et al. ............ 349/122 |
| 2006/0274047 A1 * | 12/2006 | Spath et al. ................... 345/173 |
| 2010/0293782 A1 * | 11/2010 | Yamazaki et al. .............. 29/825 |

FOREIGN PATENT DOCUMENTS

| | | |
|---|---|---|
| JP | 2005-96397 A | 4/2005 |
| JP | 2005-196122 A | 7/2005 |

* cited by examiner

*Primary Examiner* — Sophie Hon

(74) *Attorney, Agent, or Firm* — Birch, Stewart, Kolasch & Birch, LLP

(57) ABSTRACT

An antireflective film is provided and includes: a transparent substrate; at least one conductive layer formed from a composition including at least one transparent conductive polymeric material and a compound forming a cross-liking site, the compound having a plurality of cross-linking reactive groups, at least one of which cross-links with the transparent conductive polymeric material; and at least one low refractive index layer.

7 Claims, No Drawings

ANTIREFLECTIVE FILM, POLARIZING PLATE AND IMAGE DISPLAY DEVICE

BACKGROUND OF THE INVENTION

1. Field of the Invention

The present invention relates to an antireflective film, and further to a polarizing plate and an image display device each using the film.

2. Description of Related Art

An antireflective film is disposed on a display surface for prevention of contrast reductions due to extraneous light reflected off and images mirrored in the screen of every variety of image display device, such as a liquid crystal display device (LCD), a plasma display panel (PDP), an electroluminescent display (ELD) or a cathode ray tube display device (CRT). Therefore, the antireflective film is required to have high physical strength (including abrasion resistance), high transparency, high chemical resistance and high weather resistance (including heat-and-moisture resistance and light stability). In addition, antistatic properties are required of the antireflective film in order to prevent dust (dirt or the like), which depresses display's visibility, from adhering to the antireflective film surface.

The antireflective film containing a conductive metal oxide is known (See JP-A-2005-196122). In the case of using a metal oxide as conductive material, the metal oxide density in a conductive layer must be increased in order for the conductive layer to having the required conductivity. However, there are cases where addition of metal oxide in excessive amounts adversely affects the transparency, hardness and durability.

On the other hand, the antireflective film using a conductive polymer as conductive material is known (See JP-A-2005-96397). Such a film is formed from the conductive polymer produced by vapor-phase polymerization of its monomer(s), and it is desired that the film undergo further improvements in productivity and durability.

SUMMARY OF THE INVENTION

An aspect of an illustrative, non-limiting embodiment of the invention is to provide an antireflective film that has excellent antistatic properties aimed at preventing adhesion of dust (dirt or the like), high adhesion and high physical strength including abrasion resistance and ensures excellent productivity.

Another aspect of an illustrative, non-limiting embodiment of the invention is to provide a polarizing plate using the aforesaid antireflective film (a protective film for a polarizing plate, which has undergone antireflective treatment according to an appropriate method) and an image display device using such a polarizing plate.

As a result of our intensive studies to solve the issues as described above, it has been found that the foregoing aspects can be realized by means described below. More specifically, aspects of the invention include the following:

(1) An antireflective film including: a transparent substrate; at least one conductive layer formed from a composition containing a transparent conductive polymeric material and a compound forming a cross-linking site (hereinafter referred to as a cross-linking site-forming compound) having a plurality of cross-linking reactive groups, at least one of which cross-links with the transparent conductive polymeric material; and at least one low refractive index layer.

(2) The antireflective film as described in (1), further including at least one hard coating layer and an antiglare layer between the transparent substrate and the conductive layer.

(3) The antireflective film as described in (1) or (2), wherein the transparent conductive polymeric material is a complex of a π-conjugated conductive polymer and a polymer dopant.

(4) The antireflective film as described in (3), wherein the polymer dopant has at least two groups, at least one of which is an anionic group and at least another one of which is a non-anionic group.

(5) The antireflective film as described in (3) or (4), wherein the cross-linking site-forming compound has a group cross-linking with the polymer dopant.

(6) The antireflective film as described in any one of (3) to (5), wherein the cross-linking site-forming compound is a compound having a group capable of cross-linking with the polymer dopant and a group having an ethylenically unsaturated double bond or an oligomer having a group capable of cross-linking with the polymer dopant and a group having an ethylenically unsaturated double bond.

(7) The antireflective film as described in any one of (3) to (6), wherein the cross-linking site-forming compound is a hydrolysate of a mixture of a compound represented by formula (1) and a compound represented by formula (2), and/or a condensate of the hydrolysate:

$$(R^1)_m\text{-}M^1\text{-}(OR^3)_n \qquad (I)$$

(where $R^1$ is a group having as a partial structure a group cross-linking with the polymer dopant, $R^3$s are the same or different and each of them is an alkyl group or a haloalkyl group, n is 1 or above, m is 1 or above, and $M^1$ is silicon, aluminum, zirconium, titanium, tin or antimony)

$$(R^2)_p\text{-}M^2\text{-}(OR^4)_q \qquad (II)$$

(where $R^2$ is a group having as a partial structure an ethylenically unsaturated double bond, $R^4$s are the same or different and each of them is an alkyl group or a haloalkyl group, p is 1 or above, q is 1 or above, and $M^2$ is silicon, aluminum, zirconium, titanium, tin or antimony).

(8) The antireflective film as described in any one of (1) to (7), including on the conductive layer a middle refractive index layer with a refractive index of 1.5 to 1.7, a high refractive index layer with a refractive index of 1.7 to 2.1 and the low refractive index layer with a refractive index of 1.3 to 1.5 in increasing order of distance from the transparent substrate.

(9) A polarizing plate including a polarizer sandwiched between two protective films, at least one of which is the antireflective film as described in any one of (1) to (8).

(10) An image display device including the polarizing plate as described in (9).

DETAILED DESCRIPTION OF EXEMPLARY EMBODIMENTS

According to an aspect of the invention, it is possible to produce an antireflective film which has excellent antistatic properties, high adhesion and high abrasion resistance and ensures high productivity. Display devices (image display devices) provided with the present antireflective films or the present polarizing plates are reduced in extraneous light reflected off and background's reflection mirrored in their respective screens, so very high visibility forms a feature of them.

An antireflective film according to an aspect of the invention is illustrated below.

<Layer Structure of Antireflective Film>

An antireflective film according to an aspect of the invention has on a transparent substrate (which is also referred to as a transparent support, a base film or a support) at least one conductive layer and at least one low refractive index layer, and can further have other functional layers singly or in the form of multiple layers in accordance with the intended use thereof.

One among preferred embodiments of the present antireflective film is a multilayer antireflective film formed by providing constituent layers on a substrate so as to achieve reflectivity reduction by optical interference in consideration of their refractive indexes, layer thicknesses, number and arranging order. The most simple structure of an antireflective film is a structure that only a low refractive index layer is applied to a substrate. For further reduction in reflectivity, it is favorable to configure an antireflective layer as a combination of a high refractive index layer having a higher refractive index than a substrate and a low refractive index layer having a lower refractive index than a substrate. Examples of a layer structure of the antireflective layer include a double-layer structure that a substrate is coated with a high refractive index layer and a low refractive index layer in order of mention and a triple-layer structure that a substrate is coated with three layers different in refractive index, namely a middle refractive index layer (which has a refractive index higher than the substrate or a hard coating layer and lower than a high refractive index layer), a high refractive index layer and a low refractive index layer which are stacked on top of each other in order of mention. In addition, there are many proposals of an antireflective film having a stack of more antireflective layers. Of those proposals, a structure that a middle refractive index layer, a high refractive index layer and a low refractive index layer are applied in order of mention to a hard coating layer provided on a substrate is preferred from the viewpoints of durability, optical properties, cost and productivity. Examples of such a structure include those disclosed in JP-A-8-122504, JP-A-8-110401, JP-A-10-300902, JP-A-2002-243906 and JP-A-2000-111706.

Moreover, another function may be imparted to each constituent layer. For instance, soil-resistant properties may be imparted to a low refractive index layer, while anti-static properties may be imparted to a high refractive index layer (as disclosed, e.g., in JP-A-10-206603 and JP-A-2002-243906).

Examples of a layer structure preferred by the present antireflective film are shown below. In each of the following structures, the term "base film" refers to the support formed of a film.

Base film/conductive layer/low refractive index layer

Base film/hard coating layer/conductive layer/low refractive index layer

Base film/antiglare layer/conductive layer/low refractive index layer

Base film/conductive layer/hard coating layer/low refractive index layer

Base film/conductive layer/antiglare layer/low refractive index layer

Base film/moisture-proof layer/hard coating layer/conductive layer/low refractive index layer Base film/moisture-proof layer/antiglare layer/conductive layer/low refractive index layer Moisture-proof layer/base film/hard coating layer/conductive layer/low refractive index layer Moisture-proof layer/base film/antiglare layer/conductive layer/low refractive index layer Base film/conductive layer/middle refractive index layer/high refractive index layer/low refractive index layer Base film/hard coating layer/conductive layer/medium refractive index layer/high refractive index layer/low refractive index layer Moisture-proof layer/base film/hard coating layer/conductive layer/middle refractive index layer/high refractive index layer/low refractive index layer These layers can be formed according to an evaporation method, an atmospheric pressure plasma method, a coating method or so on. In point of productivity, formation by a coating method is advantageous.

Various layers which can constitute the present antireflective layer are described below.

1. Conductive Layer

The conductive layer for use in the invention is high in conductivity, flexibility and adhesion to adjacent layers, and can be formed easily by use of a coating method.

(1) Transparent Conductive Material

Herein, the transparent conductive material denotes a polymeric substance having transparency and conductivity, and it is a simple material or a complex of two or more materials.

As the transparent conductive material, a cationic or anionic polymer showing ionic conductivity or an electronic conductivity-exhibiting complex of a π-conjugated conductive polymer and a dopant attendant thereto can be used to advantage. Of these two materials, the complex of a π-conjugated conductive polymer and a dopant attendant thereto is especially preferable to the other.

1-(1) π-Conjugated Conductive Polymer

As the π-conjugated conductive polymer, any of organic polymers having π-conjugated systems as their respective main chains can be used. Examples of such a polymer include polypyrrole, polythiophene, polyacetylene, polyphenylene, polyphenylenevinylene, polyaniline, polyacene, polythiophenevinylene, and a copolymer of thereof. In point of easiness of polymerization and stability in the air, polypyrrole, polythiophene and polyaniline are preferred over the others.

Although such π-conjugated conductive polymers can have sufficient conductivity and compatibility with binder resins without having any substituents, introduction of functional groups, such as alky, carboxyl, sulfo, alkoxy, hydroxyl or cyano groups, into those π-conjugated conductive polymers is favorable for further increasing dispersibility or solubility in a binder resin as well as conductivity.

As to such a π-conjugated conductive polymers, examples of such a substituted polypyrrole include poly(3-methylpyrrole), poly(3-ethylpyrrole), poly(3-n-propylpyrrole), poly(3-butylpyrrole), poly(3-octylpyrrole), poly(3-decylpyrrole), poly(3-docecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole) and poly(3-methyl-4-hexyloxypyrrole).

Examples of polythiophene include poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene) poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene) and poly(3-methyl-4-carboxybutylthiophene).

Examples of polyaniline include poly(2-methylaniline), poly(3-isobutylaniline), poly(2-anilinesulfonic acid) and poly(3-anilinesulfonic acid).

Of those polymers, a homopolymer selected from polypyrrole, polythiophene, poly(N-methylpyrrole), poly(3-methylthiophene), poly(3-methoxythiophene) or poly(3,4-ethylenedioxythiophene), or a copolymer of any two of constituent monomers of the polymers recited above is preferably used in point of resistance and reactivity. Furthermore, polypyrrole and poly(3,4-ethylenedioxythiophene) have an advantage over the others in that they have higher conductivity and yield an improvement in heat resistance.

In addition, the polymers substituted by alkyl groups, such as poly(N-methylpyrrole) and poly(3-methylthiophene), are also advantageous because they obtain improvements in solvent solubility and compatibility with and dispersibility in a binder resin. Of the alkyl groups, a methyl group is preferred over the others because it has no negative effect on the conductivity.

1-(2) Dopant

The transparent conductive material is preferably a complex of the π-conjugated conductive polymer as recited above and a dopant.

The dopant is preferably a polymer dopant, notably a polyanionic polymer that has anionic groups in a molecule.

The dopant including a polyanionic polymer is hereinafter referred to as a polyanionic dopant. The complex formation is effected via salt formation by chemically oxidative doping of a conductive polymer with such a polyanionic dopant.

The anionic groups of a polyanionic dopant are preferably functional groups which enable chemically oxidative doping of a conductive polymer with the dopant, and besides, proton acids of which can unite with any of vinyl, glycidyl and hydroxyl groups. Suitable examples of such proton acids include a sulfuric acid group, a phosphoric acid group, a sulfo group, a carboxyl group and a phospho group. Of these acid groups, a sulfo group and a carboxyl group are preferred over the others from the viewpoint of chemically oxidative doping.

Examples of a polyanionic dopant having sulfo groups include a vinylsulfonic acid polymer, a styrenesulfonic acid polymer, an allylsulfonic acid polymer, an acrylsulfonic acid polymer, a methacrylsulfonic acid polymer, a 2-acrylamide-2-methylpropanesulfonic acid polymer and an isoprenesulfonic acid polymer. Each of these polymers may be a homopolymer or a copolymer of its constituent monomer and any one or more of constituent monomers of the other polymers.

Examples of a polyanionic dopant having carboxyl groups include a vinylcarboxylic acid polymer, a styrenecarboxylic acid polymer, an allylcarboxylic acid polymer, an acrylcarboxylic acid polymer, a methacrylcarboxylic acid polymer, a 2-acrylamide-2-methylpropanecarboxylic acid polymer, an isoprenecarboxylic acid polymer and an acrylic acid polymer. Each of these polymers may be a homopolymer or a copolymer of its constituent monomer and any one or more of constituent monomers of the other polymers.

The transparent conductive material can be produced with ease by performing, in a solvent, chemical oxidation polymerization of a precursor monomer to form the π-conjugated conductive polymer in the presence of an appropriate oxidant, an appropriate oxidation catalyst and the polymer dopant as recited above (preferably a polyanionic dopant).

The conductive material may contain a dopant other than the polyanionic dopant as recited above in order to have further enhanced electric conductivity and thermal stability. Examples of such a dopant include halogen compounds, Lewis acids and proton acids. More specifically, they include organic acids such as an organic carboxylic acid and organic sulfonic acid, organic cyano compounds and fullerene compounds.

As to the halogen compounds, examples thereof include chlorine, bromine, iodine, iodine chloride, iodine bromide and iodine fluoride.

As to the proton acids, examples thereof include inorganic acids, such as hydrochloric acid, sulfuric acid, nitric acid, phosphoric acid, fluoroboric acid, hydrofluoric acid and perchloric acid, organic carboxylic acids, phenolic compounds and organic sulfonic acids.

As to the organic carboxylic acids, examples thereof include formic acid, acetic acid, oxalic acid, benzoic acid, phthalic acid, maleic acid, fumaric acid, malonic acid, tartaric acid, citric acid, lactic acid, succinic acid, monochloroacetic acid, dichloroacetic acid, trichloroacetic acid, trifluoroacetic acid, nitroacetic acid and triphenylacetic acid.

As to the organic sulfonic acids, examples thereof include alkylbenzenesulfonic acids, alkylnaphthalenesulfonic acids, alkylnaphthalenedisulfonic acids, polycondensation products of naphthalenesulfonic acid and formaldehyde, polycondensation products of melaminesulfonic acid and formaldehyde, naphthalenedisulfonic acid, naphthalenetrisulfonic acid, dinaphthylmethanedisulfonic acid, anthraquinonesulfonic acid, anthraquinonedisulfonic acid, anthracenesulfonic acid and pyrenesulfonic acid. In addition, metal salts of these acids can also be used.

As to the organic cyano compounds, examples thereof include dichlorodicyanobenzoquinone (DDQ), tetracyanoquinodimethane and tetracyanoazanaphthalene.

As to the fullerene compounds, examples thereof include hydrogenated fullerene, hydroxylated fullerene, carboxylated fullerene and sulfonated fullerene.

It is preferable that a polymer dopant is cross-linked with any of the cross-linking site-forming compounds described hereinafter. The formation of cross-links can enhance the adhesion of the conductive layer and ensure excellent abrasion resistance.

Additionally, it is also preferable that the polymer dopant has at least two kinds of functional groups, at least one kind of which are anionic groups and at least another kind of which are non-anionic groups.

Among the functional groups that the polymer dopant has, anionic groups remaining without forming salts together with the π-conjugated conductive polymer as recited above or the non-anionic groups are preferably cross-linked with the cross-linking site-forming compound as described hereinafter.

The non-anionic functional groups of the polymer dopant have no particular restrictions so long as they can be cross-linked with the cross-linking site-forming compounds as described below, but hydroxyl, amino and mercapto groups can be given as examples thereof. These groups each can be introduced into the polymer dopant by copolymerizing a constituent monomer of the polymer dopant and a monomer chosen appropriately from 2-vinylethanol, hydroxymethyl vinyl ketone, 2-hydroxyethyl vinyl ketone, allylamine, 2-aminoethyl vinyl ether, 3-vinyloxy-1-propylamine or 2-allylaminoethanethiol. The proportion of monomeric units having non-anionic functional groups in the copolymer is preferably from 1 to 50 mole %, particularly preferably from 5 to 30 mole %. When the proportion is lower than 1 mole %, the cross-linking sites becomes deficient in number; while, when the proportion is higher than 50 mole %, the resultant copolymer cannot function sufficiently as anionic dopant.

1-(3) Complex of π-Conjugated Conductive Polymer and Polymer Dopant

Taking the case of a polyanionic dopant, the complex of a π-conjugated conductive polymer and a polymer dopant is illustrated below.

During the complex formation, as the main chain of a conductive polymer grows, so are salts formed between anionic groups of a polyanionic dopant and the conductive polymer. Accordingly, the main chain of the conductive polymer grows along the polyanionic dopant and countless salts are formed between the resultant conductive polymer and the polyanionic dopant, thereby producing a complex. In this complex, it is presumed that every three monomeric units of the conductive polymer and every one anionic-group unit form a salt and several pieces of short-grown polymer form salts along the polyanionic dopant with a long length.

One example of a method of forming a complex that combines a conductive polymer and a polyanionic dopant is a method of performing chemical oxidation polymerization of a monomer to form the conductive polymer in the presence of the polyanionic dopant.

In the chemical oxidation polymerization, the oxidant and the oxidation catalyst used for polymerizing the monomer are not particularly restricted so long as they can oxidize the precursor monomer and contribute to production of the π-conjugated conductive polymer, and examples thereof include peroxosulfates, such as ammonium peroxodisulfate, sodium peroxodisulfate and potassium peroxodisulfate; transition metal compounds, such as ferric chloride, ferric sulfate, ferric nitrate and cupric chloride; metal halides, such as boron trifluoride and aluminum chloride; metal oxides, such as silver oxide and cesium oxide; peroxides, such as hydrogen peroxide and ozone; organic peroxides, such as benzoyl peroxide; and oxygen.

The chemical oxidation polymerization may be carried out in a solvent. The solvent used therein has no particular restriction so long as it can dissolve the polyanionic dopant used and the conductive polymer formed therein. Examples of such a solvent include water, methanol, ethanol, propylene carbonate, cresol, phenol, xylenol, acetone, methyl ethyl ketone, hexane, benzene, toluene, dioxane, diethyl ether, acetonitrile, benzonitrile, N,N-dimethylformamide, N,N-dimethylacetamide, N-methyl-2-pyrrolidone, hexamethylphosphoric triamide, 1,3-dimethyl-2-imidazolidine, dimethylimidazoline, ethyl acetate, 2-methyltetrahydrofuran, dimethylsulfoxide, sulfolane and diphenylsulfone. These solvents can be used alone or as mixed solvent of any two or more thereof on an as needed basis.

The amount of a transparent conductive material applied is preferably from 0.01 to 5.0 g/m², far preferably from 0.05 to 2.0 g/m², especially preferably from 0.10 to 1.0 g/m².

When the transparent conductive material is the complex of a π-conjugated conductive polymer and a polymer dopant, the ratio of the per-unit molecular weight of the π-conjugated conductive polymer to the per-unit molecular weight of the polymer dopant is preferably from 1:1 to 1:5, far preferably from 1:1 to 1:2.

1-(4) Cross-linking Site-Forming Compound

The term "cross-linking site-forming compound" as used in the invention refers to a compound having a plurality of cross-linking reactive groups, at least one of which cross-links with a transparent conductive material.

When the transparent conductive material is the complex of a π-conjugated conductive polymer and a polymer dopant, it is preferable that the cross-linking site-forming compound cross-links with the polymer dopant, especially residual anionic groups and/or non-anionic functional groups of the polymer dopant.

The group that is present in the cross-linking site-forming compound and cross-links with an anionic group or non-anionic group in the polymer dopant is preferably a hydroxyl group, an alkoxysilyl group, a cyclic ether group or an isocyanate group, far preferably a group having as a partial structure a glycidyl group, an oxetane group or an isocyanate group, most preferably an isocyanate group.

In an exemplary embodiment of the invention, cross-liking is performed such that a residual anionic group (e.g., a sulfo group or a carboxyl group) of polyanion of the polymer dopant reacts with a hydroxyl group, an alkoxysilyl group or a cyclic ether group of the cross-linking site-forming compound to form an ester. In another exemplary embodiment of the invention, cross-liking is performed such that a non-anionic functional group (e.g., a hydroxyl group or an amino group) of the polymer dopant reacts with a cyclic ether group or an isocyanate group of the cross-linking site-forming compound.

In order to cause these reactive groups to react effectively, various catalysts and various polymerization initiators may be used.

For the cyclic ether group, a catalyst such as a tertiary amine or a quaternary ammonium salt, and a cationic photo-initiator such as an iodonium salt or a sulfonium salt may be used.

For the isocyanate group, a catalyst such as a tertiary amine or an organometallic compound may be used.

It is a preferred embodiment of the invention that the cross-linking site-forming compound has a group that can cross-link with a polymer dopant and a reactive group other than groups capable of cross-linking with a polymer dopant. The reactive group other than groups capable of cross-linking with a polymer dopant is preferably a group having an ethylenically unsaturated double bond, and more specifically, a group having as a partial structure a (meth)acryloyl group, an allyl group, a vinyl ether group or a (meth)acrylamide group.

In order to cause these reactive groups to react effectively, various catalysts and various polymerization initiators may be used, and the use of various radical photo-initiators in particular is favorable.

Cross-linking site-forming compounds usable in the invention are not limited to particular ones, but suitable examples thereof include the compounds illustrated below.

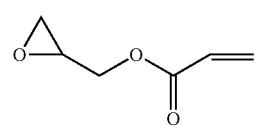

X-1

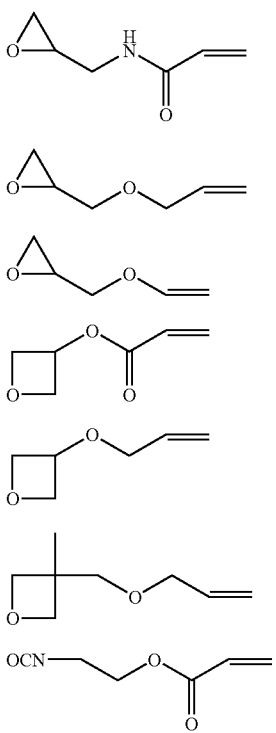

X-2

X-3

X-4

X-5

X-6

X-7

X-8

It is another preferred embodiment of the invention that the cross-linking site-forming compound is an oligomer having groups capable of cross-linking with a polymer dopant and groups having ethylenically unsaturated double bonds. The groups capable of cross-linking with a polymer dopant and the groups having ethylenically unsaturated double bonds are the sane as recited above.

The mass-average molecular weight of the oligomer having groups capable of cross-linking with a polymer dopant and groups having ethylenically unsaturated double bonds is preferably from 500 to 10,000, far preferably from 500 to 5,000, especially preferably from 700 to 3,000, as determined in a condition that components having molecular weight below 300 are excluded.

As to the oligomer having groups capable of cross-linking with a polymer dopant and groups having ethylenically unsaturated double bonds, it is appropriate that the components having molecular weight greater than 10,000 make up 10 mass % (weight %) or below, preferably 5 mass % or below, far preferably 3 mass % or below, of the total components having molecular weight of 300 or above. When the oligomer including such components in a content greater than 10 mass % is used in a (curable) composition, it sometimes occurs that the cured film obtained by curing the resultant composition is inferior in transparency and adhesion to a substrate.

Herein, the mass-average molecular weight and the molecular weight are molecular weight values measured with a GPC analyzer using columns, TSKgel GMHxL, TSKgel G4000HxL and TSKgel G2000HxL (which are all the trade names of products of Tosoh Corporation), and THF as a solvent and calculated in terms of polystyrene according to detection by a differential refractometer, and the content is shown as a percentage of the total area of peaks in the foregoing molecular weight range, with the total area of peaks corresponding to molecular weight of 300 or above being taken as 100%.

Moreover, it is preferable that the cross-linking site-forming compound is hydrolysate of at least one mixture of a compound represented by the following formula (1) and a compound represented by the following formula (2), and/or condensate of the hydrolysate.

$$(R^1)_m\text{-}M^1\text{-}(OR^3)_n \quad \text{Formula (1)}$$

Herein, $R^1$ is a group having as a partial structure a group capable of cross-linking with the polymer dopant as recited above, $R^3$s are the same or different and each of them is an alkyl group or a haloalkyl group, n is 1 or above, m is 1 or above, and $M^1$ is silicon, aluminum, zirconium, titanium, tin or antimony.

$R^1$ is a group capable of cross-linking with the polymer dopant as recited above, preferably a cyclic ether group or an isocyanate group, far preferably a group having as a partial structure a glycidyl group, an oxetane group or an isocyanate group.

$R^3$ is preferably an alkyl group, notably an ethyl group or a methyl group.

m is preferably 1, and n is preferably 2 or above.

As to $M^1$, silicon in particular is preferred over the others.

$$(R^2)_p\text{-}M^2\text{-}(OR^4)_q \quad \text{Formula (2)}$$

Herein, $R^2$ is a group having as a partial structure an ethylenically unsaturated double bond, $R^4$s are the same or different and each of them is an alkyl group or a haloalkyl group, p is 1 or above, q is 1 or above, and $M^2$ is silicon, aluminum, zirconium, titanium, tin or antimony.

$R^2$ is a group having an ethylenically unsaturated double bond, preferably a group having as a partial structure a (meth)acryl group, an allyl group, a vinyl ether group or a (meth)acrylamide group.

$R^4$ is preferably an alkyl group, notably an ethyl group or a methyl group.

p is preferably 1, and q is preferably 2 or above.

As to $M^2$, silicon in particular is preferred over the others.

Hydrolysate of at least one mixture of a compound represented by formula (1) and a compound represented by formula (2), and/or condensate of the hydrolysate is a cross-linking site-forming compound in a sol state. This compound is combined with a polymer dopant at two or more of its cross-linking sites, and the components thereof further form bonds among themselves at their residual cross-linking sites. So, an increase in cross-linking density of the conductive layer can be achieved.

Examples of a compound represented by formula (1), though not particularly restricted, include the following.

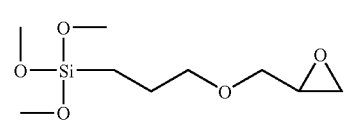

Y-1

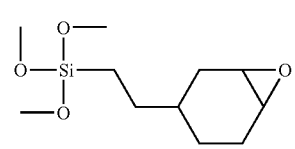

Y-2

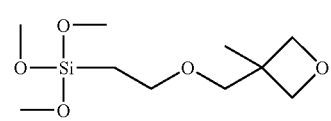

Y-3

-continued

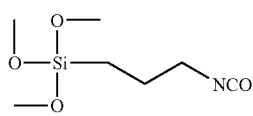

Y-4

Examples of a compound represented by formula (2), though not particularly restricted, include the following.

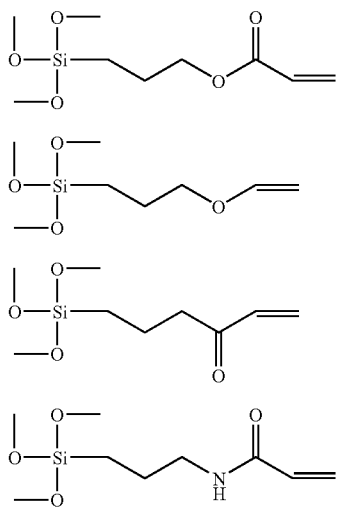

As to at least one mixture of a compound represented by formula (1) and a compound represented by formula (2), the ratio of the compound represented by formula (1) to the compound represented by formula (2) is preferably from 1:9 to 9:1 by mole, far preferably from 2:8 to 8:2 by mole, particularly preferably from 3:7 to 7:3 by mole.

The hydrolysis and condensation reactions are performed by adding water in an amount of 0.05 to 2.0 moles, preferably 0.1 to 1.0 mole, per mole of hydrolyzable groups ($OR^3$ and $OR^4$ in formulae (1) and (2)) and stirring at a temperature between 25° C. and 100° C. in the presence of a catalyst usable in the invention.

The mass-average molecular weight of the hydrolysate and partial condensate thereof is preferably from 500 to 10,000, far preferably from 500 to 5,000, especially preferably from 700 to 3,000, as determined in a condition that components having molecular weight below 300 are excluded.

Of the components having molecular weight of 300 or above in the hydrolysate and its partial condensate, the components having molecular weight greater than 10,000 make up preferably 10 mass % or below, far preferably 5 mass % or below, further preferably 3 mass % or below. When such high molecular-weight components have a content greater than 10 mass %, it sometimes occurs that the cured film obtained by curing the curable composition containing such hydrolysate and its partial condensate is inferior in transparency and adhesion to a substrate.

Herein, the mass-average molecular weight and the molecular weight are molecular weight values measured with a GPC analyzer using columns, TSKgel GMHxL, TSKgel G4000HxL and TSKgel G2000HxL (which are all the trade names of products of Tosoh Corporation), and THF as a solvent and calculated in terms of polystyrene according to detection by a differential refractometer, and the content is shown as a percentage of the total area of peaks in the foregoing molecular weight range, with the total area of peaks corresponding to molecular weight of 300 or above being taken as 100%.

By $^{29}Si$—NMR analyses of the hydrolysate and its partial condensate, the state in which the hydrolyzable groups in formulae (1) and (2) are condensed into —OSi forms can be ascertained.

Herein, when the occurrence of a case where three bonds of Si undergo condensation into the form of —OSi is denoted by T3, the occurrence of a case where two bonds of Si undergo condensation into the form of —OSi is denoted by T2, the occurrence of a case where one bond of Si undergoes condensation into the form of —OSi is denoted by T1 and the occurrence of a case where no bond of Si undergoes condensation is denoted by T0, the condensation rate α is determined by the expression $α=(T3×3+T2×2+T1×1)/3/(T3+T2+T1+T0)$. And the condensation rate is preferably from 0.2 to 0.95, far preferably from 0.3 to 0.93, particularly preferably from 0.4 to 0.9.

The α value smaller than 0.1 means that hydrolysis and condensation are insufficient, so such a case cannot offer sufficient curing because the monomer content is high, while the α value greater than 0.95 means that hydrolysis and condensation advance to excess and most of hydrolyzable groups are consumed, so such a case resists producing the intended effects because it causes reductions in interactions with a binder polymer, a resin substrate and inorganic fine particles.

The hydrolysate and its partial condensate are described in more detail. The hydrolysis reaction and the condensation reaction subsequent thereto are generally carried out in the presence of a catalyst. Examples of such a catalyst include inorganic acids, such as hydrochloric acid, sulfuric acid and nitric acid; organic acids, such as oxalic acid, acetic acid, butyric acid, maleic acid, citric acid, formic acid, methanesulfonic acid and toluenesulfonic acid; inorganic bases, such as sodium hydroxide, potassium hydroxide and ammonia; organic bases, such as triethylamine and pyridine; metal alkoxides, such as triisopropoxylaluminum, tetrabutoxyzirconium, tetrabutyltitanate and dibutyltin dilaurate; metal chelate compounds having as their individual central metal Zr, Ti or Al or the like; and fluorine-containing compounds, such as KF and $NH_4F$.

These catalysts may be use alone or as combinations of two or more thereof.

The hydrolysis and condensation reactions can be performed in a solventless or in-solvent condition, but it is preferable to use an organic solvent for homogeneous mixing of ingredients. Examples of an organic solvent suitable for such a purpose include alcohol, aromatic hydrocarbon, ether, ketone and ester.

The solvents preferred herein are solvents in which compounds represented by formula (1) and/or compounds represented by formula (2) and catalysts can be dissolved. In addition, it is preferable that such solvents are organic solvents which provide advantages in processes when used as coating solutions or part of coating solutions, and what's more which are not detrimental to solubility and dispersiblity when mixed with other ingredients including fluoropolymers.

Alcohol usable for the foregoing purpose includes monohydric alcohol and dihydric alcohol. As the monohydric alcohol, 1-8C saturated aliphatic alcohol compounds are suitable.

Examples of the alcohol include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol acetate monoethyl ether.

Examples of the aromatic hydrocarbon include benzene, toluene and xylene, examples of the ether include tetrahydrofiran and dioxane, examples of the ketone include acetone, methyl ethyl ketone, methyl isobutyl ketone, diisobutyl ketone and cyclohexanone, and examples of the ester include ethyl acetate, propyl acetate, butyl acetate and propylene carboxylate.

The organic solvents as recited above can be used alone or as mixtures of two or more thereof. In those reactions, the solids concentration has no particular limitation, but it is generally in the 1%-to-100% range.

Those reactions are performed through addition of water in an amount of 0.05 to 0.2, preferably 0.1 to 1 mole per mole of hydrolyzable groups in compounds of formulae (1) and (2) and agitation with or without a solvent in the presence of a catalyst at a temperature between 25° C. to 100° C.

In the invention, it is preferable that the hydrolysis is carried out through agitation at a temperature between 25° C. and 100° C. in the presence of at least one metal-chelate compound that has ligands including alcohol represented by formula $R^5OH$ (wherein $R^5$ represents a 1-10C alkyl group) and a compound represented by formula $R^6COCH_2COR^7$ (wherein $R^6$ represents a 1-10C alkyl group and $R^7$ represents a 1-10C alkyl group or a 1-10C alkoxy group) and contains as its central metal a metal chosen from Zr, Ti or Al.

Alternatively, it is advantageous to use a fluorine-containing compound as a catalyst. This is because fluorine-containing compounds have an ability to advance hydrolysis and condensation completely, so they can determine the degree of polymerization through selection of addition amount of water and therefore permit arbitrary setting of molecular weight.

As far as the metal-chelate compound has ligands including alcohol represented by formula $R^5OH$ (wherein $R^5$ represents a 1-10C alkyl group) and a compound represented by formula $R^6COCH_2COR^7$ (wherein $R^6$ represents a 1-10C alkyl group and $R^7$ represents a 1-10C alkyl group or a 1-10C alkoxy group) and contains as its central metal a metal chosen from Zr, Ti or Al, it can be favorably used without any other particular restriction. Two or more metal-chelate compounds may be used in combination so long as they fall under the category defined above. More specifically, the metal-chelate compound favorably used in the invention is a compound selected from among the compounds represented by formulae $Zr(OR^5)_{p1}(R^6COCHCOR^7)_{p2}$, $Ti(OR^5)_{q1}(R^6COCHCOR^7)_{q2}$ and $Al(OR^5)_{r1}(R^6COCHCOR^7)_{r2}$, respectively, and serves a function of promoting condensation reaction of hydrolysate and its partial condensate.

The 1-10C alkyl groups represented by $R^5$s or $R^6$s in each of the metal-chelate compounds may be the same or different, and examples thereof include an ethyl group, an n-propyl group, an i-propyl group, an n-butyl group, a sec-butyl group, a t-butyl group, an n-pentyl group and a phenyl group. Examples of $R^7$ include not only the 1-10C alkyl groups as recited above but also 1-10C alkoxy groups, such as a methoxy group, an ethoxy group, an n-propoxy group, an i-propoxy group, an n-butoxy group, a sec-butoxy group and a t-butoxy group. In addition, p1, p2, q1, q2, r1 and r2 in the metal-chelate compounds represent integers determined so as to satisfy the equations p1+p2=4, q1+q2=4 and r1+r2=3.

Examples of those metal-chelate compounds are not limited to particular ones, but they include zirconium-chelate compounds, such as zirconium tri-n-butoxyethylacetoacetate, zirconium di-n-butoxybis(ethylacetoacetate), zirconium n-butoxytris(ethylacetoacetate), zirconium tetrakis(n-propylacetoacetate), zirconium tetrakis(acetylacetoacetate) and zirconium tetrakis(ethylacetoacetate); titanium-chelate compounds, such as titanium diisopropoxybis(ethylacetoacetate), titanium diisopropoxybis(acetylacetate) and titanium diisopropoxybis(acetylacetone); and aluminum-chelate compounds, such as aluminum diisopropoxyethylacetoacetate, aluminum diisopropoxyacetylacetonate, aluminum isopropoxybis(ethylacetoacetate), aluminum isopropoxybis(acetylacetonate), aluminum tris(ethylacetoacetate), aluminum tris (acetylacetonate) and aluminum monoacetylacetonatebis (ethylacetoacetate).

Preferred ones of the metal-chelate compounds recited above are zirconium tri-n-butoxyethylacetoacetate, titanium diisopropoxybis(acetylacetonate), aluminum diisopropoxyethylacetoacetate and aluminum tris(ethylacetoacetate). Those metal-chelate compounds may be used alone or as mixtures of two or more thereof. Moreover, partial hydrolysis products of those metal-chelate compounds can also be used.

The proportion in which the metal-chelate compound or compounds are used on the compounds of formulae (1) and (2) is preferably from 0.01 to 50 mass %, far preferably from 0.1 to 50 mass %, further preferably from 0.5 to 10 mass %. By using the metal-chelate compound or compounds in the proportion range as specified above, rapid progress of condensation reaction becomes possible, the coating film formed can have good durability, and the composition containing the hydrolysate, the partial condensate and the metal-chelate compound(s) in accordance with the invention becomes satisfactory in storage stability.

To the coating solution used in the invention, at least either a β-diketone compound or a β-ketoester compound is preferably added in addition to the composition containing the sol component and the metal-chelate compound(s). Further description of this addition is given below.

The compound preferably added is at least either a β-diketone or β-ketoester compound represented by formula $R^6COCH_2COR^7$, and it functions as a stability improver for the composition used in the invention. More specifically, it is thought that the β-diketone or β-ketoester compound added and the metal atom(s) in the metal-chelate compound(s) (at least any of the zirconium, titanium and aluminum compounds) are coordinated, and thereby the function of the metal-chelate compounds, namely promotion of the condensation reaction of hydrolysate and partial condensate of the compounds represented by formulae (1) and (2), is inhibited, and the storage stability of the resultant composition is enhanced. $R^6$ and $R^7$ constituting each of the β-diketone and β-ketoester compounds have the same meanings as those constituting the metal-chelate compound as recited above, respectively.

Examples of such β-diketone and β-ketoester compounds include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione and 5-methyl-hexanedione. Of these compounds, ethyl acetoacetate and acetylacetone are preferred over the others, and acetylacetone in particular is used to advantage. These β-diketone and β-ketoester compounds can be used alone or as mixtures of two or more thereof. In the invention, it is appropriate that the β-diketone or β-ketoester compound be used in an amount of 2 moles or above, preferably 3 to 20 moles, per mole of the metal-chelate compound(s). The addition in an amount smaller than 2 mole is undesirable because there is a fear for poor storage stability of the resultant composition.

The amount of the cross-linking site-forming compound applied is preferably from 0.01 to 3.0 g/m², far preferably from 0.02 to 2.0 g/m², especially preferably from 0.05 to 1.0 g/m².

The conductive layer in the invention can be formed with ease in accordance with such a coating method as described below. The thickness of the conductive layer is preferably from 0.01 to 10 μm, far preferably from 0.03 to 7 μm, further preferably 0.05 to 5 μm.

In addition, the surface resistance of the conductive layer is preferably from $10^4$ to $10^{13}$ Ω/sq, far preferably from $10^5$ to $10^{12}$ Ω/sq especially preferably from $10^6$ to $10^{11}$ Ω/sq. The surface resistance of the conductive layer can be determined by a four-probe method.

The conductive layer is preferably transparent in a substantial sense. Specifically, it is preferable that the haze of the conductive layer is 10% or below, preferably 5% or below, far preferably 3% or below, especially preferably 1% or below. And it is advantageous for the conductive layer to have a transmittance of light with a wavelength of 550 nm in a range of 50% or above, preferably 70% or above, especially preferably 80% or above.

Moreover, the refractive index of the conductive layer is preferably from 1.40 to 1.70, far preferably from 1.45 to 1.60.

The strength of the conductive layer according to the invention is preferably H or higher, far preferably 2H or higher, further preferably 3H or higher, especially preferably 4H or higher, expressed in terms of the pencil hardness under a 1-kg load.

From the viewpoint of improvement of adhesion properties of an antireflective film, it is preferred that at least one hard coating layer or antiglare layer as described below is provided between the transparent substrate and the conductive layer. The adhesion properties between the transparent substrate and the conductive layer can be improved to a certain level by including the cross-linking site-forming compound in the conductive layer-forming composition including the polymeric material, and can be further improved by using a cross-linkable or polymerizable compound in the hard coating layer or antiglare layer.

2. Hard Coating Layer

It is possible to provide the present antireflective film with a hard coating layer, preferably on one side of the transparent substrate, for the purpose of imparting physical strength to the film. The hard coating layer may have a multilayer structure including two or more layers.

From the viewpoint of an optical design for an antireflective film, it is appropriate that the refractive index of the hard coating layer provided in the invention be in a range of 1.48 to 2.00, preferably 1.52 to 1.90, far preferably 1.55 to 1.80. In a preferred embodiment of the invention where at least one low refractive index layer is provided on the hard coating layer, refractive indexes too lower than the range as specified above become a cause of degradation in antireflective property, while too high refractive indexes contribute to a tendency to intensify the tint of reflected light.

From the viewpoint of imparting sufficient durability and impact resistance to the film, the thickness of the hard coating layer is adjusted generally to the order of 0.5 to 50 μm, preferably 1 to 20 μm, far preferably 2 to 10 μm, especially preferably 3 to 7 μm.

In addition, the strength of the hard coating layer is preferably H or higher, far preferably 2H or higher, especially preferably 3H or higher, as determined by pencil hardness testing.

Furthermore, the slighter the abrasion a sample piece of hard coating layer suffers in the Taber test according to JIS K5400, the higher suitability the hard coating layer has.

The hard coating layer is preferably formed by cross-linking reaction or polymerization reaction of an ionizing radiation curable compound. More specifically, the hard coating layer can be formed by applying a coating composition containing an ionizing radiation curable multifunctional monomer or oligomer to the transparent substrate directly or via another layer, and then by subjecting the multifunctional monomer or oligomer to cross-linking reaction or polymerization reaction.

The functional groups of the ionizing radiation curable multifunctional monomer or oligomer are preferably photo-, electron beam- or radiation-polymerizable functional groups. Of these groups, photopolymerizable functional groups are preferred over the others.

Examples of a photopolymerizable functional group include polymerizable unsaturated functional groups, such as a (meth)acryloyl group, a vinyl group, a styryl group and an allyl group. Of these groups, a (meth)acryloyl group is preferred over the others.

Instead of or in addition to the polymerizable unsaturated group as recited above, cross-linkable functional groups may be introduced into the binder. Examples of a cross-linkable functional group include an isocyanate group, an epoxy group, an aziridine group, an oxazoline group, an aldehyde group, a carbonyl group, a hydrazine group, a carboxyl group, a methylol group and an active methylene group. Additionally, vinylsulfonic acid, an acid anhydride, a cyanoacrylate derivative, melamine, etherified methylol, ester, urethane and a metal alkoxide such as tetramethoxysilane can also be utilized as a monomer capable of forming a cross-linked structure. Moreover, functional groups that can deliver cross-linking properties as a result of decomposition reaction, such as blocked isocyanate groups, may be used. In other words, cross-linkable groups adopted in the invention may be groups whose reactivity, though not shown immediately, is shown as a result of decomposition. The binder having such cross-linkable functional groups can form a cross-linked structure by heating after application.

In the hard coating layer, matting particles having an average size of 1.0 to 15.0 μm, preferably 1.5 to 10.0 μm, such as particles of an inorganic compound or resin particles, may be incorporated for the purpose of imparting internal scattering properties.

To the binder of the hard coating layer, a high refractive index monomer, inorganic particles or both can be added for the purpose of controlling the refractive index of the hard coating layer. Inorganic particles have not only a refractive index control effect but also an effect of inhibiting curing shrinkage from occurring by cross-linking reaction. In the invention, the polymer produced by polymerizing any of the multifunctional monomers recited above, any of the high refractive index monomers recited above or both after formation of the hard coating layer, inclusive of inorganic particles dispersed therein, is referred to as the binder.

The hard coating layer is adjusted in haze to suit the function intended to be imparted to the antireflective film.

In the case of keeping the image sharpness, reducing the surface reflectance, and imparting a light scattering function to neither the interior nor the surface of the hard coating layer, the lower haze value the better. Specifically, the haze value is preferably 10% or below, far preferably 5% or below, especially preferably 2% or below.

On the other hand, in the case of imparting an antiglare function by surface scattering of the hard coating layer, the surface haze is preferably from 5% to 15%, far preferably from 5% to 10%.

In the other case of intending to render patterns, unevenness of color, inconsistency in brightness, and glare of a liquid crystal panel indistinct by internal scattering of the hard coating layer, and to impart a function of increasing a viewing angle by scattering, the internal haze value (the value obtained by subtracting the surface haze value from the total haze value) is preferably from 10% to 90%, far preferably from 15% to 80%, especially preferably from 20% to 70%.

The present film can be adjusted to have any values of surface haze and internal haze according to the intended purpose.

As to the surface roughness profile of the hard coating layer, it is appropriate for obtaining a clear surface with the intention of keeping image sharpness that the center-line-average surface roughness (Ra) among the surface roughness characteristics be adjusted to 0.10 μm or below. The Ra value is preferably 0.08 μm or below, far preferably 0.06 μm or below. In the present film, the surface roughness of the film is dominated by the surface roughness of the hard coating layer, so the center-line-average roughness of the antireflective film can be adjusted to the foregoing range by controlling the center-line-average surface roughness of the hard coating layer.

In addition to control of the surface roughness profile with the intention of keeping image sharpness, it is preferable to control transmitted image definition. The definition of images transmitted by the clear antireflective film is preferably 60% or above. The transmitted image definition is generally an index to the blur degree of images projected through film, and the greater value thereof means that images viewed through film are the higher in clarity and the better in quality. To be concrete, the transmitted image definition is preferably 70% or above, far preferably 80% or above.

<Photoinitiator>

Examples of a radical photopolymerization initiator include acetophenones, benzoins, benzophenones, phosphine oxides, ketals, anthraquinones, thioxanthones, azo compounds, peroxides (JP-A-2001-139663 and so on), 2,3-dialkyldione compounds, disulfide compounds, fluoroamine compounds, aromatic sulfonium compounds, lophine dimers, onium salts, borate salts, active esters, active halogen compounds, inorganic complexes and coumarins.

These initiators may be used alone or as mixtures of two or more thereof.

Various examples thereof are also described in *Saishin UV Koka Gijutsu*, p. 159, K. K. Gijutu Joho Kyokai (1991), and Kiyoshi Kato, *Shigaisen Koka System*, pp. 65-148, Sogo Gijutsu Center (1989), and they are useful in the invention, too.

Suitable examples of commercially available radical photopolymerization initiators include KAYACURE (DETX-S, BP-100, BDMK, CTX, BMS, 2-EAQ, ABQ, CPTX, EPD, ITX, QTX, BTC, MCA and so on, products of Nippon Kayaku Co., Ltd.), IRGACURE (651, 184, 500, 819, 907, 369, 1173, 1870, 2959, 4265, 4263 and so on, products of Ciba Specialty Chemicals Inc.), Esacure (KIP100F, KB1, EB3, BP, X33, KT046, KT37, KIP150 and TZT, products of Sartomer Company Inc.), and combinations of two or more of these products.

It is appropriate that those photopolymerization initiators be used in an amount of 0.1 to 15 parts by mass (weight), preferably 1 to 10 parts by mass, per 100 parts by mass of multifunctional monomer(s).

<Surface Condition Improver>

For remedying surface condition troubles (including unevenness in coating, drying mark and point defect), it is favorable that a surface condition improver containing at least either a fluorine atom or a silicon atom is added to a coating solution used for making any of layers on a substrate.

The surface condition improver used suitably is a compound capable of changing the surface tension of a coating solution by at least 1 mN/m. The expression "changing the surface tension of a coating solution by at least 1 mN/m" means that the surface tension of a coating solution after addition of a surface condition improver, inclusive of the process of concentration during coating and drying, changes by at least 1 mN/m as compared with the surface tension of a coating solution free of surface condition improver. It is preferable that the surface condition improver has an effect of reducing the surface tension of a coating solution by at least 1 mN/m, preferably at least 2 mN/m, particularly preferably at least 3 mN/m.

Suitable examples of a fluorine-containing surface condition improver include compounds containing fluoroaliphatic groups, and suitable examples of such compounds include the compounds disclosed in JP-A-2005-115359, JP-A-2005-221963 and JP-A-2005-234476.

3. Antiglare Layer

An antiglare layer is provided for the purpose of contributing an antiglare property through surface scattering, preferably further contributing a hard coating property for enhancement of abrasion resistance, to the film.

As methods of contributing an antiglare property to the film, there are known the method as disclosed in JP-A-6-16851 wherein an antiglare layer is formed by lamination of an embossed matte film having microscopic asperities on its surface, the method as disclosed in JP-A-2000-206317 wherein surface roughness is formed through curing shrinkage difference caused in an ionizing radiation curable resin by difference in amount of exposure to ionizing radiation, the method as disclosed in JP-A-2000-338310 wherein transmissive fine particles and transmissive resin are gelled and solidified through a decrease in a mass ratio of a good solvent to the transmissive resin by drying to result in formation of asperities on the coating surface, the method as disclosed in JP-A-2000-275404 wherein surface roughness is imparted by externally applied pressure, the method as disclosed in JP-A-2005-195819 wherein asperities are formed on the coating surface by utilizing phase separation in the process of evaporating a solvent from a solution of two or more polymers, and so on. And these known methods can be used in the invention, too.

<Transmissive Particles>

A preferred aspect applicable to an antiglare layer for use in the invention consists in that the antiglare layer contains a binder capable of imparting hard coating properties, transmissive particles for imparting an antiglare property and a solvent as essential ingredients and surface roughness is formed with asperities of individual transmissive particles themselves or aggregates in which those particles gather. It is preferable that the antiglare layer having an antiglare property offers a compromise between the antiglare property and a hard coating property.

Examples of transmissive particles used suitably in the antiglare layer include particles of inorganic compounds, such as silica particles and $TiO_2$ particles, and resin particles, such as acrylic resin particles, cross-linked acrylic resin particles, polystyrene particles, cross-linked styrene resin particles, melamine resin particles and benzoguanamine resin particles. Of these particles, cross-linked styrene resin particles, cross-linked acrylic resin particles and silica particles are preferred over the others. The matting particles used may be either spherical or indefinite in shape.

In addition, matting particles of two or more types different in size may be used together. It is possible to impart antiglare property by use of matting particles having greater sizes and another optical property by use of matting particles having smaller sizes. For instance, when an antiglare antireflective film is stuck on a high-definition display having a pixel count of 133 ppi or above, a problem in point of display image quality, which is referred to as "glitter", occurs in some cases. The glitter is brought about by loss of uniformity in brightness, which results from expansion or reduction of picture elements by microscopic asperities present on the antiglare antireflective film surface, so it can be greatly improved by using matting particles which are smaller in size than matting particles used for imparting antiglare property and different in refractive index from the binder.

The matting particles are incorporated into an antiglare layer so that their content in an antiglare hard-coating layer formed ranges from 10 to 1,000 mg, preferably from 100 to 700 mg, per square meter.

The thickness of the antiglare layer is preferably from 1 to 20 μm, far preferably from 2 to 10 μm. The thickness adjustment to such a range can serve a function as a hard coating, and also allows protection against curling and brittleness.

On the other hand, it is appropriate that the center-line-average roughness (Ra) of the antiglare layer be adjusted to 0.10 μm or below, preferably 0.08 μm or below, far preferably 0.06 μm or below.

The strength of the antiglare layer is preferably H or higher, far preferably 2H or higher, especially preferably 3H or higher, as determined by pencil hardness testing.

4. Low Refractive Index Layer

For reduction in reflectance of the present film, it is appropriate that a low refractive index layer be provided.

The refractive index of the low refractive index layer is preferably from 1.20 to 1.46, far preferably from 1.25 to 1.46, particularly preferably from 1.30 to 1.46.

The thickness of the low refractive index layer is preferably from 50 to 200 nm, far preferably from 70 to 100 nm. The haze of the low refractive index layer is preferably 3% or below, far preferably 2% or below, especially preferably 1% or below. The concrete strength of the low refractive index layer, as evaluated by the pencil hardness test under a load of 500 g, is preferably at least H, far preferably at least 2H, especially preferably at least 3H.

In addition, for improvement in soil resistance of the antireflective film, it is appropriate that the contact angle of the film surface with respect to water be 90 degrees or above, preferably 95 degrees or above, particularly preferably 100 degrees or above.

Examples of an aspect of the curable composition suitable for forming the low refractive index layer include (1) a composition including a fluorine-containing polymer having cross-linkable or polymerizable functional groups, (2) a composition containing as a main component the hydrolytic condensation product of a fluorine-containing organosilane material, and (3) a composition containing a monomer having two or more ethylenically unsaturated groups and inorganic fine particles of hollow structure.

4-(1) Fluorine-containing Polymer having Cross-linkable or Polymerizable Functional Groups As an example of a fluorine-containing polymer having cross-linkable or polymerizable functional groups, mention may be made of a copolymer of a fluorine-containing monomer and a monomer having a cross-linkable or polymerizable functional group. Examples of the fluorine-containing monomer include fluoroolefin (such as fluoroethylene, vinylidene fluoride, tetrafluoroethylene, hexafluoroethylene, hexafluoropropylene and perfluoro-2,2-dimethyl-1,3-dioxol), partially or completely fluorinated alkyl ester derivatives of (meth)acrylic acid (such as Biscoat 6FM, a product of Osaka Organic Chemical Industry Ltd., and M-2020, a product of Daikin Industries, Ltd.) and completely or partially fluorinated vinyl ethers.

One aspect of the monomer used for imparting a cross-linking group is a (meth)acrylate monomer having in advance a cross-linkable functional group in its molecule, such as glycidyl methacrylate. Another aspect of the monomer used for the foregoing purpose is a monomer having a functional group, such as hydroxyl group, which is modified into a cross-linkable or polymerizable group through substitution after copolymerization with a fluorine-containing monomer. Examples of such a monomer include (meth)acrylate monomers each having a carboxyl group, a hydroxyl group, an amino group, a sulfonic acid group or the like (such as (meth)acrylic acid, methylol (meth)acrylate, hydroxyalkyl (meth)acrylate and allyl acrylate). The latter aspect is disclosed in JP-A-10-25388 and JP-A-10-147739.

In terms of solubility, dispersibility, coating characteristics, soil resistance and antistatic properties, the fluorine-containing copolymers can contain copolymerizable components as appropriate. For the purpose of giving soil resistance and a slippery property in particular to the copolymers, it is favorable to introduce silicone into either the main chain, side chains or both.

As an example of a method of introducing a partial structure of polysiloxane into the main chain, mention may be made of the method as disclosed in JP-A-6-93100 which uses a polymeric initiator, such as an azo group-containing polysiloxaneamide (commercially available products of which include VPS-0501 and VPS-1001, trade names, products of Wako Pure Chemical Industries, Ltd.). On the other hand, the introduction into side chains can be performed, e.g., by using the method of introducing polysiloxane having a reactive group as its one end group (e.g., Silaplain series, produced by Chisso Corporation) by polymer reaction as described in *J. Appl. Polym. Sci.*, 2000, 78, 1955, and JP-A-56-28219, or by synthesis according to the method of polymerizing a polysiloxane-containing silicone macromer. Both of these methods can be favorably used.

Those polymers may be used in combination with curing agents having polymerizable unsaturated groups, if needed, as disclosed in JP-A-2000-17028. In addition, as disclosed in JP-A-2002-145952, it is preferable that those polymers are used in combination with fluorine-containing multifunctional compounds having polymerizable unsaturated groups. Examples of a polymerizable unsaturated group-containing multifunctional compound include the monomers having two or more ethylenically unsaturated groups per molecule. Moreover, the hydrolytic condensates of organosilanes as disclosed in JP-A-2004-170901, notably the hydrolytic condensates of (meth)acryloyl group-containing organosilanes, can be used to advantage.

It is advantageous for these compounds to be used in combination with the polymers, notably the polymers having polymerizable unsaturated groups in their main units, because such combinations can produce a significant effect on enhancement of abrasion resistance.

When the curability of polymers themselves is not sufficient, the required level of curability can be imparted to the polymers by compounding the polymers and cross-likable compounds. When the polymers have, e.g., hydroxyl groups in their main units, it is preferable that a variety of amino compounds are used as curing agents. The amino compound usable as a cross-linkable compound is a compound having at least two amino groups chosen from, e.g., hydroxyalkylamino groups, alkoxyalkylamino groups, or both, with examples including melamine compounds, urea compounds, benzoguanamine compounds and glycoluril compounds. In the curing of these compounds, it is preferable that organic acids or salts thereof are used.

Examples of those fluorine-containing polymers include those disclosed in JP-A-2003-222702 and JP-A-2003-183322.

4-(2) Hydrolytic Condensate of Fluorine-containing Organosilane Material

A composition containing hydrolytic condensate of a fluorine-containing organosilane compound as the main component is also preferable, because it also has a low refractive index and can ensure highly hard coating surface. As the hydrolytic condensate, the condensate of a fluorinated alkane having a hydrolyzable silanol group on one end or either end thereof and a tetraalkoxysilane compound is suitable. Examples of such a composition include the compositions disclosed in JP-A-2002-265866 and JP-A-2002-317152.

4-(3) Composition Containing Monomer having Two or More Ethylenically Unsaturated Groups and Inorganic Fine Particles of Hollow Structure Still another aspect of the low refractive index layer preferred in the invention is a layer including a binder and particles of a low refractive index. The particles of a low refractive index, though may be either inorganic or organic particles, are preferably particles having holes on the inside. Examples of hollow particles include the silica particles disclosed in JP-A-2002-79616. The refractive index of those particles is preferably from 1.15 to 1.40, far preferably from 1.20 to 1.30. Examples of the binder include the monomers having two or more ethylenically unsaturated groups per molecule as described in the earlier section on the hard coating layer.

To the low refractive index layer for use in the invention, it is advantageous to add any of the polymerization initiators as described in the earlier section on the hard coating layer. When the composition for forming the low refractive index layer contains a radical polymerizable compound, the polymerization initiator can be used in an amount of 1 to 10 parts by mass, preferably 1 to 5 parts by mass, for the compound.

In the low refractive index layer for use in the invention, inorganic particles can be incorporated. For imparting abrasion resistance, it is advantageous to use fine particles having sizes ranging from 15% to 150%, preferably fiom 30% to 100%, far preferably from 45% to 60%, of the thickness of the low refractive index layer.

For the purpose of imparting properties including soil resistance, water resistance, chemical resistance and a slippery property, known polysiloxane- or fluorine-containing antifouling agents and slipping agents can be added to the low refractive index layer as appropriate.

5. High Refractive Index Layer and Middle Refractive Index Layer

The present film is provided with a high refractive index layer and a middle refractive index layer, and these layers can enhance antireflective property of the film in combination with the low refractive index layer by utilization of optical interference occurring between those layers.

Hereinafter, the high refractive index layer and the middle refractive index layer are sometimes collectively called a high refractive index layer. Incidentally, the adjectives "high", "middle" and "low" in the terms "high refractive index layer", "middle refractive index layer" and "low refractive index layer" describe a relative magnitude relation among refractive indexes of layers. As for the refractive index relation with the transparent substrate, it is preferable that the relations, transparent substrate>low refractive index layer and high refractive index layer>transparent substrate, are satisfied.

Sometimes in this specification a high refractive index layer, a middle refractive index layer and a low refractive index layer are collectively called "an antireflective layer".

When the antireflective film is formed by providing a low refractive index layer on a high refractive index layer, the refractive index of the high refractive index layer is preferably from 1.50 to 2.40, far preferably from 1.60 to 2.20, further preferably from 1.70 to 2.10, especially preferably from 1.80 to 2.00.

When the antireflective film is formed by providing on the conductive layer a middle refractive index layer, a high refractive index layer and a low refractive index layer in order of increasing distance from the substrate, the refractive index of the high refractive index layer is preferably from 1.60 to 2.10, far preferably from 1.70 to 2.00. And the refractive index of the middle refractive index layer is adjusted to a value intermediate between the refractive index of the low refractive index layer and that of the high refractive index layer. The refractive index of the middle refractive index layer is preferably from 1.50 to 1.70. Herein, the refractive index of the low refractive index layer is preferably from 1.3 to 1.5.

Examples of inorganic particles used in the high refractive index layer and the middle refractive index layer include $TiO_2$, $ZrO_2$, $Al_2O_3$, $In_2O_3$, $ZnO$, $SnO_2$, $Sb_2O_3$, ITO and $SiO_2$. Of these fillers, $TiO_2$ and $ZrO_2$ are preferred over the others from the viewpoint of heightening the refractive index. It is also preferable that the surface of such an inorganic filler is treated with a silane coupling agent or a titanate coupling agent, and a surface treatment agent having a functional group capable of reacting with the binder is favorably applied to the filler surface.

The content of such inorganic particles in the high refractive index layer is preferably from 10 to 90%, far preferably from 15 to 80%, particularly preferably from 15 to 75%, of the mass of the high refractive index layer. Two or more kinds of inorganic particles may be used together in the high refractive index layer.

When the low refractive index layer is provided on the high refractive index layer, it is preferable that the refractive index of the high refractive index layer is higher than that of the transparent substrate.

In the high refractive index layer, it is also possible to use a binder prepared by cross-linking or polymerization reaction of an ionizing radiation curable compound containing an aromatic ring, an ionizing radiation curable compound containing a halogenation element other than fluorine (e.g., Br, I or Cl), or an ionizing radiation curable compound containing an S, N or P atom.

The thickness of the high refractive index layer can be designed appropriately according to the intended use. When the high refractive index layer is used as an optical interference layer, the thickness thereof is preferably from 30 to 200 nm, far preferably from 50 to 170 nm, particularly preferably from 60 to 150 nm.

When the high refractive index layer does not contain particles for imparting an antiglare function, the lower the haze thereof the better. Specifically, the haze is preferably 5% or below, far preferably 3% or below, particularly preferably 1% or below.

<Coating Solvent>

In the layer applied so as to adjoin the base film among the foregoing constituent layers, it is advantageous to incorporate at least one or more solvents in which the base film is soluble and at least one or more solvents in which the base film is insoluble. By having such an aspect, the adjoining layer not only can avoid excess impregnation of the base film with its ingredient(s) but also can ensure adhesion to the base film. In addition, it is preferable that at least one of the solvents in which the base film is soluble has a higher boiling temperature than at least one of the solvents in which the base film is insoluble. And it is preferable by far that the boiling temperature difference between the solvent having the highest boiling point among the solvents in which the base film is soluble and the solvent having the highest boiling point among the solvents in which the base film is insoluble is at least 30° C., especially at least 40° C.

The ratio of (A) the total amount of solvents in which the transparent base film is soluble to (B) the total amount of solvents in which the transparent base film is insoluble (the (A)/(B) ratio) is preferably from 5/95 to 50/50 by mass, far preferably from 10/90 to 40/60 by mass, further preferably from 15/85 to 30/70 by mass.

6. Substrate

The substrate for use in the present film has no particular restriction, and it may be any of a transparent resin film, a transparent resin plate and a transparent resin sheet. Examples of a transparent resin film include cellulose acylate films (such as cellulose triacetate film (refractive index: 1.48), cellulose diacetate film, cellulose acetate butyrate film or cellulose acetate propionate film), polyethylene terephthalate film, polyether sulfone film, polyacrylic resin film, polyurethane resin film, polyester film, polycarbonate film, polysulfone film, polyether film, polymethylpentene film, polyether ketone film, (meth)acrylonitrile film, polyolefin film, film of a polymer having alicyclic structures (e.g., film of norbornene resin (ARTON, trade name, a product of JSR Corporation)), and film of amorphous polyolefin (ZEONEX, trade name, a product of ZEON Corporation). Of these film materials, triacetyl cellulose, polyethylene terephthalate and a polymer having alicyclic structures are preferred over the others. And triacetyl cellulose in particular is used to advantage.

The thickness the substrate can have in the invention is generally of the order of 25 µm to 1,000 µm, preferably from 25 µm to 250 µm, far preferably from 30 µm to 90 µm.

The substrate having any width can be used in the invention, From the viewpoints of handling, yield ratio and productivity, the substrate having a width of 100 to 5,000 mm can generally be used. The width of the substrate is preferably from 800 to 3,000 mm, far preferably from 1,000 to 2,000 nm. The substrate can be handled in the form of a long roll. The length of the roll is generally from 100 to 5,000 m, preferably from 500 to 3,000 m.

It is advantageous for the substrate to have a smooth surface, and the average roughness Ra of the substrate is preferably 1 µm or below, far preferably from 0.0001 to 0.5 µm, further preferably from 0.001 to 0.1 µm.

<Cellulose Acylate Film>

Of the various films, cellulose acylate films, which are generally used as protective films of polarizing plates, are preferred over the others because of their high transparency, slight optical birefringence and easiness of manufacturing.

There are known various techniques for improving the mechanical characteristics, transparency and planarity of cellulose acylate films. Of these known techniques, the techniques disclosed in *Kokai Giho* (Journal of Technical Disclosure), 2001-1745, are applicable to the film for use in the invention.

Of cellulose acylate films, cellulose triacetate film is preferred over the others in the invention, and cellulose acetate film as a cellulose acylate film having an acetylation degree of 59.0 to 61.5% is used to advantage. The term "acetylation degree" as used herein refers to the amount of acetic acid bonded per unit mass of cellulose. And the acetylation degree follows the measurement and calculation of acetylation degree in ASTM: D-817-91 (the testing method for cellulose acetate and the like).

The viscosity-average polymerization degree (DP) of cellulose acylate is preferably 250 or above, far preferably 290 or above.

It is preferable that the cellulose acylate used in the invention has a Mw/Mn value close to 1.0 (where Mw is mass-average molecular weight, and Mn is number-average molecular weight), which can be determined by gel permeation chromatography. In other words, the cellulose acylate preferably has a narrow molecular-weight distribution. Specifically, the suitable Mw/Mn value is from 1.0 to 1.7, preferably from 1.3 to 1.65, especially preferably from 1.4 to 1.6.

In general the total substitution degree is not shared equally ⅓ by ⅓ among the hydroxyl groups in the 2-, 3- and 6-positions of cellulose acylate, but the substitution degree of 6-position hydroxyl groups tends to be smaller than those of 2- and 3-position hydroxyl groups. In the cellulose acylate used in the invention, however, the substitution degree of 6-position hydroxyl groups is preferably greater than those of 2- and 3-hydroxyl groups.

It is appropriate that the 6-position hydroxyl groups be substituted by acyl groups in a proportion of at least 32%, preferably at least 33%, particularly preferably at least 34%, of the total substitution degree. In addition, it is preferable that the substitution degree of the 6-position acyl groups in the cellulose acylate is 0.88 or above. In addition to acetyl group, the 6-position hydroxyl groups may be substituted by acyl groups containing 3 or more carbon atoms, such as propionyl, butyroyl, valeloyl, benzoyl and acryloyl groups. The substitution degree in each position can be determined by NMR measurements.

The cellulose acetates prepared by the methods disclosed in JP-A-11-5851, Examples, paragraphs [0043] to [0044] Synthesis Example 1, paragraphs [0048] to [0049] Synthesis Example 2, and paragraphs [0051] to [0052] Synthesis Example 3, can be used as cellulose acylate for use in the invention.

<Polyethylene Terephthalate Film>

As a substrate film used in the invention, polyethylene terephthalate film is also preferred because it has excellent transparency, mechanical strength, planarity, chemical resistance and moisture resistance, what's more it is cheap.

For enhancement of the adhesion strength between a transparent plastic film and the hard coating layer, the use of transparent plastic film having undergone easily-adhering treatment is preferable by far.

As examples of commercially available optical PET film with an easily-adhering layer, mention may be made of COSMOSHINE A4100 and A4300, products of Toyobo Co., Ltd.

7. Coating Method

Each constituent layer of the present film can be formed using various methods including but not limited to the following methods.

Specifically, the coating methods usable herein include known methods, such as a dip coating method, an air knife coating method, a curtain coating method, a roller coating method, a wire-bar coating method, a gravure coating method, an extrusion coating method (a die coating method) (see U.S. Pat. No. 2,681,294), and a microgravure coating method. Of these methods, a microgravure coating method and a die coating method are preferred over the others.

The microgravure coating method usable in the invention is a coating method characterized in that a gravure roll having a diameter of about 10 mm to about 100 mm, preferably about 20 mm to about 50 mm, and a gravure pattern engraved all around the periphery is placed underneath a substrate and brought to a state of rotation in the direction opposite to a transport direction of the substrate, and application of a coating solution is performed by transferring a coating solution fed on the gravure roll surface in an amount kept constant by scraping an excess coating solution off the gravure roll surface with a doctor blade to the under surface of the substrate in a position where the upper surface of the substrate is in a free state. A transparent substrate in a roll form is continuously wound off, and thereon at least either the hard coating layer or at least one of low refractive index layers containing fluorine-containing olefin polymers can be coated by the microgravure coating method.

As to the coating conditions in the microgravure coating method, the line number of a gravure pattern engraved on the gravure roll is preferably from 50 to 800 per inch, far preferably from 100 to 300 per inch, the depth of the gravure pattern is preferably from 1 to 600 μm, far preferably from 5 to 200 μm, the revs of the gravure roll is preferably from 3 to 800 rpm, far preferably from 5 to 200 rpm, and the transport speed of a substrate is preferably from 0.5 to 100 m/min, far preferably from 1 to 50 m/min.

For supplying of the present film with high productivity, the adoption of an extrusion method (a die coating method) is favorable. In the region of a small wet coverage (20 cc/m² or below) in particular, such as in the case of a hard coating layer or an antireflective layer, the adoption of the manufacturing method disclosed in JP-A-2006-122889 allows enhancement of coating film uniformity.

8. Polarizing Plate

The present film is used as protective film arranged on one side or either side of a polarizer and, together with the polarizer, can form a polarizing plate.

Although the present film may be used as one of the protective films and commonly used cellulose acetate film may be used as the other protective film, it is advantageous to use as the other protective film a cellulose acetate film made by the solution film-formation method and stretched at a stretch ratio of 10 to 100% in the width direction of the film in a roll form.

As polarizers, there are known an iodine polarizer, a dye polarizer using a dichroic dye and a polyene polarizer. The iodine polarizer and the dye polarizer are generally formed using polyvinyl alcohol film.

The slow axes of the transparent substrate of the antireflective film and the cellulose acetate film and the transmission axis of the polarizer are positioned so as to become parallel in a substantial sense.

Moisture permeability of protective films is important for productivity of a polarizing plate. The polarizer and the protective films are bonded together with an aqueous adhesive, and this adhesive solvent is dried by diffusion through the protective films. The higher the moisture permeability of the protective films, the faster the drying becomes and the more the productivity is improved. However, when the moisture permeability becomes too high, permeation of moisture into the polarizers occurs depending on the use environment of a liquid crystal display (under high humidity) to result in lowering of polarization power.

The determination of what moisture permeability the protective films have is based on the thicknesses, free volumes, and hydrophilic or hydrophobic degrees of the transparent substrate and the polymer film (and the polymerizable liquid crystal compound).

When the present film is used as a protective film of a polarizing plate, the moisture permeability thereof is preferably from 100 to 1,000 g/m²24 hrs, far preferably from 300 to 700 g/m²24 hrs.

When the film is manufactured, the thickness of a transparent substrate can be controlled by a lip flow rate and line speed, or by stretching or compression. As the moisture permeability varies with main materials used, it can be adjusted to the desired range by thickness control.

In the case of manufacturing the film, the free volume of the transparent substrate can be controlled by drying temperature and time adopted.

In this case also, the moisture permeability can be adjusted to the desired range by free volume control since it varies with main materials used.

The hydrophilic or hydrophobic degree of the transparent substrate can be controlled by additives. The moisture permeability is heightened by addition of hydrophilic additives to the free volume, while addition of hydrophobic additives lowers the moisture permeability.

By independent control of the moisture permeability, it becomes possible to manufacture a polarizing plate having an optically compensatory power at low cost and with high productivity.

The polarizer may be any of known polarizers, or may be a polarizer cut from a long length of polarizer whose absorption axis is neither parallel nor perpendicular to the direction of the length. The polarizer whose absorption axis is neither parallel nor perpendicular to the direction of the length is formed in the following manner.

Specifically, such a polarizer can be formed by stretching a continuously supplied polymer film under a tension while holding both edges thereof with holding tools. Herein, the polymer film is stretched to 1.1 to 20.0 times its original length in the direction of the width. In addition, the longitudinally traveling speed difference between the film-edge holding tools is controlled to 3% or below, and the traveling direction of the film is bend as the film edges are held with the holding tools so that the film traveling direction at the exit from the film edge holding process tilts 20 to 70 degrees toward the substantial stretch direction of the film. The 45° tilt of the film traveling direction is especially advantageous from the viewpoint of productivity.

Detailed description of the polymer film stretching method can be found in JP-A-2002-86554, paragraphs [0020] to [0030].

Of two protective films for a polarizer, it is also preferable that the film other than the antireflective film is an optically compensatory film having optically compensatory layers including an optically anisotropic layer. The optically compensatory film (retardation film) can improve viewing angle characteristics of a liquid crystal display screen.

As to the optically compensatory film, though any of known ones can be used, the optically compensatory film disclosed in JP-A-2001-100042 is preferable in point of viewing angle increase.

9. Usage Pattern of the Invention

The present film can be used in image display devices including a liquid crystal display device (LCD), a plasma display panel (PDP), an electroluminescent display (ELD) and a cathode-ray tube display device (CRT). Optical filters according to the invention can be used on known displays, such as plasma display panels (PDP) and cathode-ray tube display devices (CRT).

9-(1) Liquid Crystal Display Device

The present film and polarizing plate can be used with advantage in image display devices including a liquid crystal display device, and it is preferable that they are used as the outermost layers of displays. The crystal display device has a liquid crystal cell and two polarizing plates disposed on both side of the liquid crystal cell. The liquid crystal cell holds liquid crystal between two electrode plates. In addition, an optically anisotropic layer is arranged between the liquid crystal cell and one of the polarizing plates or, in some cases, two optically anisotropic layers are arranged between the liquid crystal cell and the two polarizing plates each.

The crystal cell is preferably a TN-mode, VA-mode, OCB-mode, IPS-mode or ECB-mode crystal cell.

<TN Mode>

In a TN-mode liquid crystal cell, rod-shaped liquid crystalline molecules are aligned in a substantially horizontal direction, and that in a state of being twisted by 60° to 120°, when no voltage is applied thereto.

TN-mode crystal cells are prevailingly utilized in color TFT liquid crystal display devices, and described in an abundant technical literature.

<VA Mode>

In a VA-mode liquid crystal cell, rod-shaped liquid crystalline molecules align in a substantially vertical direction when no voltage is applied thereto.

VA-mode liquid crystal cells include not only (1) a strict sense of VA-mode liquid crystal cell in which, while rod-shaped liquid crystalline molecules align in a substantially vertical direction when no voltage is applied thereto, they are forced to align in a substantially horizontal direction by application of a voltage thereto (as disclosed in JP-A-2-176625), but also (2) a multidomain VA-mode (MVA-mode) liquid crystal cell which ensures a viewing angle increase (as described in SID 97 Digest of Tech. Papers (preprints) 28, p. 845(1997)), (3) an n-ASM-mode liquid crystal cell in which rod-shaped liquid crystalline molecules align in a substantially vertical direction when no voltage is applied thereto, but they are brought into a twisted multidomain alignment by application of a voltage thereto (as described in preprints of Nippon Ekisho Toronkai (Symposium on Liquid Crystal), pp. 58-59 (1998)), and (4) a SURVAIVAL-mode liquid crystal cell (announced at LCD International 98).

<OCB Mode>

The liquid crystal cell of OCB mode is a liquid crystal cell of bend alignment mode in which rod-shaped liquid crystalline molecules in the upper part and those in the lower part are forced to align (symmetrically) in substantially opposite directions, and examples thereof are disclosed in U.S. Pat. Nos. 4,583,825 and 5,410,422. Since the rod-shaped liquid crystal molecules are symmetrically aligned in the upper part and the lower part of a liquid crystal cell, the bend alignment mode liquid crystal cell has an optically self-compensatory function. Therefore, this liquid crystal mode is referred to as an OCB (Optically Compensatory Bend) liquid crystal mode. The liquid crystal display devices of the bend alignment mode have an advantage of high response speed.

<IPS Mode>

The liquid crystal cell of IPS mode adopts a mode of switching by application of a lateral electric field to nematic liquid crystal, and details thereof are described in Proc. IDRC (Asia Display '95), pp. 577-580 and pp. 707-710.

<ECB Mode>

In an ECB-mode liquid crystal cell, rod-shaped liquid crystalline molecules are aligned in a substantially horizontal direction. The ECB mode is one of liquid crystal display modes having the most simple structures, and described, e.g., in JP-A-5-203946.

9-(2) Displays Other Than Liquid Crystal Display Device

<PDP>

A plasma display panel (PDP) is generally made up of a gas, glass substrates, electrodes, an electrode lead material, a thick-film print material and fluorescent substances. The glass substrates are a front glass substrate and a rear glass substrate. Each glass substrate is provided with an electrode and an insulation layer. The rear glass substrate is further provided with phosphor layers. These two glass substrates are assembled, and a gas is sealed into a space between them.

Plasma display panels are already commercially available. Descriptions thereof can be found in JP-A-5-205643 and JP-A-9-306366.

In some cases, a front plate is placed in front of a plasma display panel. It is appropriate that the front plate be strong enough to protect the plasma display panel. The front plate can be used in a state that there is a clearance between the front plate and the plasma display panel, or in a state that the front plate is bonded directly to the plasma display panel proper.

In an image display such as a plasma display panel, an optical filter can be stack directly on the display surface. When a front plate is provided in front of the display, the optical filter may be stuck on either the front side (outside) or rear side (display side) of the front plate.

<Touch Panel>

The present film can be applied to touch panels as disclosed in JP-A-5-127822 and JP-A-2002-48913.

Moreover, the present film can be used as a protective film of an organic electroluminescent device or so on.

When the present film is used in an organic electroluminescent device, the descriptions in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617 and JP-A-2002-056976 are applicable. In addition, it is preferable that those descriptions are used in combination with the descriptions in JP-A-2001-148291, JP-A-2001-221916 and JP-A-2001-231443.

EXAMPLES

Now, the invention is described in more detail on the basis of the following examples, but these examples should not be construed as limiting the scope of the invention.

<Preparation of Coating Solution for Hard Coating Layer>

| Composition of Coating Solution H-1 for Hard Coating Layer | |
|---|---|
| PET-30 | 51.0 g |
| DPHA | 10.0 g |
| Irgagure 184 | 2.0 g |
| SX-350 (30%) | 2.0 g |
| Cross-linked acrylic-styrene resin particles (30%) | 13.0 g |
| SP-13 | 0.06 g |
| Toluene | 38.5 g |

| Composition of Coating Solution H-2 for Hard Coating Layer | |
|---|---|
| PET-30 | 28.0 g |
| DPHA | 12.0 g |

Composition of Coating Solution H-2 for Hard Coating Layer

| | |
|---|---|
| Cohesive silica (secondarily aggregated grain size: 1.5 μm) | 5.0 g |
| IRGACURE 184 | 1.0 g |
| IRGACURE 907 | 0.2 g |
| SP-13 | 0.08 g |
| Methyl isobutyl ketone | 40.0 g |
| Cyclohexanone | 15.0 g |

Composition of Coating Solution H-3 for Hard Coating Layer

| | |
|---|---|
| DESOLITE Z7404 | 100.0 g |
| DPHA | 31.0 g |
| KBM-5103 | 10.0 g |
| KE-P150 | 8.9 g |
| MXS-300 | 3.4 g |
| MEK (Methyl ethyl ketone) | 29.0 g |
| MIBK (Methyl isobutyl ketone) | 13.0 g |

Composition of Coating Solution H-4 for Hard Coating Layer

| | |
|---|---|
| PET-30 | 28.0 g |
| DPHA | 12.0 g |
| IRGACURE 184 | 1.0 g |
| IRGACURE 907 | 0.2 g |
| SP-13 | 0.08 g |
| Methyl isobutyl ketone | 40.0 g |
| Cyclohexanone | 5.0 g |

The coating solutions described above were each passed through a polypropylene filter having a pore size of 30 μm, thereby preparing Coating Solutions H-1 to H-4 for hard coating layers. The ingredients used in H-1 to H-3 are specified below.

DPHA: Mixture of dipentaerythritol pentaacrylate and dipehntaerythritol hexaacrylate (produced by Nippon Kayaku Co., Ltd.)

PET-30: Mixture of pentaerythritol triacrylate and pentaerythritol tetraacrylate (produced by Nippon Kayaku Co., Ltd.)

IRGACURE 184: Polymerization initiator (produced by Ciba Specialty Chemicals Inc.)

IRGACURE 907: Polymerization initiator (produced by Ciba Specialty Chemicals Inc.)

SX-350: Cross-linked polystyrene particles having an average size of 3.5 μm (refractive index: 1.60, a 30% toluene dispersion, produced by Soken Chemical & Engineering Co., Ltd. and used after undergoing dispersion operation for 20 minutes at 10,000 rpm by means of a polytron dispersing machine)

Cross-linked acrylic-styrene resin particles: Particles having an average particle size of 3.5 μm (refractive index: 1.55, 30% toluene dispersion, produced by Soken Chemical & Engineering Co., Ltd. and used after undergoing dispersion operation for 20 minutes at 10,000 rpm by means of a polytron dispersing machine)

SP-13: Fluorine-containing surface modifier of the following

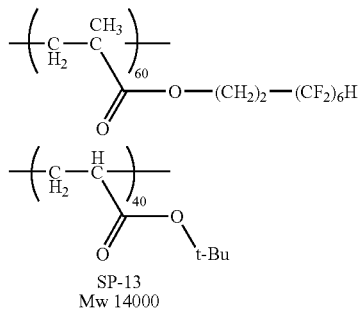

SP-13
Mw 14000

Cohesive silica: Silica having a secondarily aggregated grain size of 1.5 μm (primary grain size: dozens nm), produced by TOSOH SILICA CORPORATION DESOLITE Z7404: Photopolymerizable hard-coating liquid composition containing zirconia fine particles (produced by JSR Corporation)

KBM-5103: γ-Acryloyloxypropyltrimethoxysilane (produced by Shin-Etsu Chemical Co., Ltd.)

KE-P150: 1.5-μm Silica particles (produced by Nippon Shokubai Co., Ltd.)

MXS-300: 3-μm Cross-linked PMMA particles (produced by Soken Chemical & Engineering Co., Ltd.)

<Preparation of Coating Solution for Conductive Layer>
(Preparation of Transparent Conductive Material)
Preparation of Complex of π-Conjugated Conductive Polymer and Polymer Dopant <C-1> Preparation of Complex of Poly(ethylenedioxythiophene) and Polyallylsulfonic Acid (Transparent Conductive Material C-1)

Ethylenedioxythiophene in an amount of 14.2 g (0.1 mol) was mixed with a solution prepared by dissolving 0.15 mol of polyallylsulfonic acid in 2,000 ml of ion-exchanged water.

This mixture was kept at 20° C. with stirring, and thereto an oxidation catalyst solution prepared by dissolving 29.64 g (0.13 mol) of ammonium persulfate and 8.0 g (0.02 mol) of ferric sulfate in 200 ml of ion-exchanged water was added slowly. Herein, reaction was performed for 5 hours with stirring.

The reaction solution thus obtained was admixed with 2,000 ml of ion-exchanged water, and about 2,000 ml of solution was removed by ultrafiltration. This operation was repeated three times.

The water in the solution thus obtained was removed under reduced pressure, and a solid matter of polyallylsulfonic acid-doped poly(ethylenedioxythiophene) was obtained. This solid matter was mixed with a solution described hereinafter, thereby preparing a transparent conductive material C-1.

<C-2> Preparation of Complex of Poly(ethylenedioxythiophene) and Polyallylsulfonic Acid-Polyallylamine Copolymer (Transparent Conductive Material C-2)

Ethylenedioxythiophene in an amount of 14.2 g (0.1 mol) was mixed with a solution prepared by dissolving 0.15 mol of polyallylsulfonic acid-polyallylamine copolymer (copolymerization ratio: 80/10 by mole) in 2,000 ml of ion-exchanged water.

This mixture was kept at 20° C. with stirring, and thereto an oxidation catalyst solution prepared by dissolving 29.64 g (0.13 mol) of ammonium persulfate and 8.0 g (0.02 mol) of ferric sulfate in 200 ml of ion-exchanged water was added slowly. Herein, reaction was performed for 5 hours with stirring.

The reaction solution thus obtained was admixed with 2,000 ml of ion-exchanged water, and about 2,000 ml of solution was removed by ultrafiltration. This operation was repeated three times.

The water in the solution thus obtained was removed under reduced pressure, and a solid matter of polyallylsulfonic acid-polyallylamine copolymer-doped poly(ethylenedioxythiophene) was obtained. This solid matter was mixed with a solution described hereinafter, thereby preparing a transparent conductive material C-2.

<C-3> Preparation of Complex of Poly(ethylenedioxythiophene) and Polyallylsulfonic Acid-Poly(2-vinylethanol) Copolymer (Transparent Conductive Material C-3)

Ethylenedioxythiophene in an amount of 14.2 g (0.1 mol) was mixed with a solution prepared by dissolving 0.15 mol of polyallylsulfonic acid-poly(2-vinylethanol) copolymer (co-polymerization ratio: 80/10 by mole) in 2,000 ml of ion-exchanged water.

This mixture was kept at 20° C. with stirring, and thereto an oxidation catalyst solution prepared by dissolving 29.64 g (0.13 mol) of ammonium persulfate and 8.0 g (0.02 mol) of ferric sulfate in 200 ml of ion-exchanged water was added slowly. Herein, reaction was performed for 5 hours with stirring.

The reaction solution thus obtained was admixed with 2,000 ml of ion-exchanged water, and about 2,000 ml of solution was removed by ultrafiltration. This operation was repeated three times.

The water in the solution thus obtained was removed under reduced pressure, and a solid matter of polyallylsulfonic acid-poly(2-vinylethanol) copolymer-doped poly(ethytenedioxythiophene) was obtained. This solid matter was mixed with a solution described hereinafter, thereby preparing a transparent conductive material C-3.

(Preparation of Sol a-1 of Oligomeric Cross-linking Site-forming Compound)

In a 1,000-ml reaction vessel equipped with a thermometer, a nitrogen feed tube and a dropping funnel, 118.2 g (0.50 mol) of Y-1, 117.2 g (0.50 mol) of Z-1, 320 g (10 mol) of ethanol and 0.06 g (0.001 mol) of KF were put, and thereto 15.1 g (0.86 mol) of water was slowly added dropwise at room temperature with stirring. After conclusion of dropwise addition, stirring was continued for 3 hours at room temperature, and then heating and stirring was continued for 2 hours under reflux of methanol. Thereafter, low volatile components were distilled away under reduced pressure. The residue obtained was further filtered to yield 120 g of Sol a-1. By GPC measurement, the mass-average molecular weight of the substance thus obtained was found to be 2,000, so the obtained substance was identified as an oligomer.

(Preparation of Sol a-2 of Oligomeric Cross-linking Site-forming Compound)

In a 1,000-ml reaction vessel equipped with a thermometer, a nitrogen feed tube and a dropping funnel, 234.4 g (1.00 mol) of Z-1, 320 g (10 mol) of ethanol and 0.06 g (0.001 mol) of KF were put, and thereto 15.1 g (0.86 mol) of water was slowly added dropwise at room temperature with stirring. After conclusion of dropwise addition, stirring was continued for 3 hours at room temperature, and then heating and stirring was continued for 2 hours under reflux of methanol. Thereafter, low volatile components were distilled away under reduced pressure. The residue obtained was further filtered to yield 120 g of Sol a-2. By GPC measurement, the mass-average molecular weight of the substance thus obtained was found to be 1,800, so the obtained substance was identified as an oligomer.

| Composition of Coating Solution for Conductive Layer | |
|---|---|
| Transparent conductive material | 32.5 g |
| Cross-linking site-forming compound | 23.5 g |
| PET-30 | adjusted so that the sum of its amount and the amount of cross-linking site-forming compound is 26.5 g |
| IRGACURE 184 | 1.0 g |
| SP-13 | 0.05 g |
| MEK (methyl ethyl ketone) | 40.0 g |
| Isopropanol | 20.0 g |

<Preparation of Coating Solution for Low Refractive Index Layer>

(Preparation of Sol b)

In a reaction vessel equipped with a stirrer and a reflux condenser, 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethylacetoacetate were put, mixed with one another, then further admixed with 30 parts of ion-exchanged water, and underwent reaction at 60° C. for 4 hours. Thereafter, the reaction mixture was cooled to room temperature, thereby preparing Sol b. The mass-average molecular weight of Sol b was found to be 1,600, and besides, it was ascertained that all of the polymeric components higher than oligomers had their molecular weight in the range of 1,000 to 20,000. Moreover, gas chromatography analysis showed that acryloyloxypropyltrimethoxysilane as a raw material for the reaction didn't remain at all.

(Preparation of Dispersion A)

To 500 g of a hollow fine-particle silica sol (an isopropyl-alcohol silica sol, having an average particle diameter of 60 nm and a shell thickness of 10 nm, a silica concentration of 20 mass %, containing silica particles with a refractive index of 1.31, and prepared according to Preparation Example 4 in JP-A-2002-79616, except that the particle sizes were changed), 30 g of acryloyloxypropyltrimethoxysilane (produced by Shin-Etsu Chemical Co., Ltd.) and 1.5 g of diisopropoxyaluminum ethylacetate were added, and they were mixed together. Thereto, 9 g of ion-exchanged water was added. This admixture underwent reaction at 60° C. for 8 hours, then cooled to room temperature, and further admixed with 1.8 g of acetyl acetone. This dispersion in an amount of 500 g was subjected to solvent displacement by performing reduced-pressure distillation while adding cyclohexanone thereto so as to keep almost the same silica content. The dispersion prepared was free of extraneous matter, and its viscosity at 25° C. was 5 mPa·s as measured after adjustment of its solid concentration to 20 mass % by use of cyclohexanone. The proportion of residual isopropyl alcohol in Dispersion A thus prepared was found to be 1.5% by gas chromatographic analysis.

(Preparation of Coating Solution L-1 for Low Refractive Index Layer)

A coating Solution L-1 for a low refractive index layer was prepared by mixing 13 g of a thermally cross-linkable fluorinated polymer containing polysiloxane and hydroxyl groups and having a refractive index of 1.44 (JTA113, solid concentration: 6%, produced by JSR Corporation), 1.3 g of a colloidal silica dispersion MEK-ST-L (trade name, average particle size: 45 nm, solid concentration: 30%, produced by Nissan Chemical Industries, Ltd.), 0.65 g of the Sol b, 4.4 g of methyl ethyl ketone and 1.2 g of cyclohexanone, stirring these ingredients, and then filtering the resultant mixture through a polypropylene filter having a pore size of 1 μm. The refractive index of a layer formed with this coating solution was found to be 1.45.

(Preparation of Coating Solution L-2 for Low Refractive Index Layer)

In 500 g of methyl ethyl ketone, 37.6 g of a thermally cross-linkable fluorine-containing polymer (the fluorine- and silicone-containing thermosetting polymer disclosed in Example 1 of JP-A-11-189621), 9.40 g of a curing agent (Cymel 303, trade name, produced by Nihon Cytec Industries Inc.) and 0.92 g of a curing catalyst (Catalyst 4050, trade name, produced by Nihon Cytec Industries Inc.) were dissolved. Thereto were further added 195 parts by mass of Dispersion A (39.0 parts by mass of silica plus solid content in the surface treatment agent), 30.0 parts by mass (9.0 parts by mass as the solid content) of a colloidal silica dispersion (silica: a product identical to MEK-ST except for the particle size, average particle size: 45 nm, solid concentration: 30%, produced by Nissan Chemical Industries, Ltd.), 17.0 parts by mass (5.0 parts by mass as the solid content) of Sol b and 0.3 parts by mass of PM980M (a photopolymerization initiator, produced by Wako Pure Chemical Industries, Ltd.). The resulting mixture was diluted with cyclohexane and methyl ethyl ketone so that the solids concentration in the whole coating solution became 6 mass % and the ratio of cyclohexane to methyl ethyl ketone stood at 8:92, thereby preparing a coating Solution L-2 for a low refractive index layer. The refractive index of the layer formed with this coating solution was found to be 1.38.

(Preparation of Coating Solution L-3 for Low Refractive Index Layer)

In 500 g of methyl isobutyl ketone, 45.0 g of an ethylenically unsaturated group-containing fluorinated polymer as solid component (the fluorinated polymer (A-1) disclosed in Synthesis Example 3 of JP-A-2005-89536) was dissolved, and thereto were further added 195 parts by mass of Dispersion A (39.0 parts by mass of silica plus solid content in the surface treatment agent), 30.0 parts by mass (9.0 parts by mass as the solid content) of a colloidal silica dispersion (silica: a product identical to MEK-ST except for the particle size, average particle size: 45 nm, solid concentration: 30%, produced by Nissan Chemical Industries, Ltd.), 17.0 parts by mass (5.0 parts by mass as the solid content) of Sol b and 2.0 parts by mass of PM980M (a photopolymerization initiator, produced by Wako Pure Chemical Industries, Ltd.). The resulting mixture was diluted with methyl ethyl ketone so that the solids concentration in the whole coating solution became 6 mass %, thereby preparing a coating Solution L-3 for a low refractive index layer. The refractive index of the layer formed with this coating solution was found to be 1.38.

(Preparation of Coating Solution L-4 for Low Refractive Index Layer)

A fluorine compound having fluoroalkyl groups and polysiloxane structures, OPSTER JTA105 (solid content: 5 weight %, a product of JSR Corporation) in an amount of 100 parts by weight was mixed with 1 parts by weight of OPSTER JTA105A (solid content: 5 weight %, a product of JSR Corporation), 151.5 parts by weight of butyl acetate and 164.0 parts by weight of a siloxane oligomer, COLCOAT N103X (a product of COLCOAT Co., Ltd., number-average molecular weight: 950 as calculated in terms of ethylene glycol, solid content: 2 weight %). To this mixture was further added 42.5 g of a hollow fine-particle silica sol (an isopropyl-alcohol silica sol, having an average particle diameter of 60 nm and a shell thickness of 10 nm, a silica concentration of 20 mass %, containing silica particles with a refractive index of 1.31, and prepared according to Preparation Example 4 in JP-A-2002-79616, except that the particle sizes were changed), thereby preparing a coating Solution L-4 for a low refractive index layer. The refractive index of the layer formed with this coating solution was found to be 1.36.

<Method of Coating Antireflective Film>

Triacetyl cellulose film (TAC-TD80U, produced by FUJI-FILM Corporation) in a roll form was wound off, and thereto the coating solution for a hard coating layer was applied by direct extrusion with a coater having a slot die. The application was carried out on the condition that the transport speed was 30 m/min, and the coating applied was dried at 30° C. for 15 seconds, and further dried at 90° C. for 20 seconds. The thus formed coating layer was cured by UV irradiation using a 160 W/cm air-cooled metal halide lamp (made by Eye Graphics Co., Ltd.) in an exposure amount of 90 mJ/cm$^2$ under purge by nitrogen. Thus, a 5.0-μm thick hard coating layer having antiglare properties was formed, and wound into a roll.

In addition, the coating solution for a conductive layer was applied to the hard coating layer surface by means of a coater having a slot die. The application was carried out on the condition that the transport speed was 30 m/min, and the coating applied was dried at 30° C. for 15 seconds, and further dried at 90° C. for 20 seconds. The thus formed coating layer was cured by UV irradiation using the 160 W/cm air-cooled metal halide lamp (made by Eye Graphics Co., Ltd.) in an exposure amount of 90 mJ/cm$^2$ under purge by nitrogen. The thickness of the conductive layer thus applied and cured was found to be 0.8 μm.

On the conductive layer of the thus obtained coating film, the coating solution for a low refractive index layer was coated by direct extrusion onto the surface on the side of a backup roll where the hard coating layer was coated, thereby forming a 100-nm-thick low refractive index layer. The film thus coated was wound into a roll to make an antireflective film. The drying and curing conditions adopted are as follows. Drying: 90° C., 60 seconds.

Curing: Heating at 110° C. for 10 minutes and subsequent curing by UV irradiation using a 240 W/cm air-cooled metal halide lamp (made by Eye Graphics Co., Ltd.) in an exposure amount of 400 mJ/cm$^2$ under an atmosphere whose oxygen concentration was reduced to 0.1% by purge with nitrogen.

<Evaluation Method>

(Integrated Reflectance)

The back of the film is roughened with sand paper, and treated with black ink to avoid back reflection. In this state, the film surface is examined for integrated spectral reflectances in the wavelength region of 380 to 780 nm at an incident angle of 5° by means of a spectrophotometer (made by JASCO Corporation). As a measurement result, the arithmetic mean of integrated reflectances in the wavelength region of 450 to 650 nm is adopted. The integrated reflectances of 2.7% or below can ensure sufficient antireflective properties, and the smaller value means the better antireflective properties.

(Steel Wool Abrasion Resistance)

Steel wool is made to move to and fro on a film surface 10 times while imposing thereon a load of 200 g/cm$^2$, and the state of abrasion on the film surface is observed. Abrasion resistance is rated on a 1-to-5 scale (5 being best), and criteria adopted are as follows.

5: No abrasion
4: Only slight, hardly-perceivable abrasion
3: Clearly-visible abrasion
2: Clearly-visible heavy abrasion
1: Exfoliation of film
(Adhesion)

In the surface on the antireflective film's low refractive index layer side, incisions spaced every 1 mm are made with a cutter knife in a grid pattern of 11 lines long by 11 lines wide, thereby carving 100 squares in total. Adhesion test including a step of sticking a pressure-sensitive adhesive polyester tape made by Nitto Denko Corporation (NO. 31 B) to the film surface with those incisions by application of pressure is repeated three times at the same place. The number of squares peeled off is examined by visual observation. Criteria adopted for evaluating the adhesion are as follows.
A: None of 100 squares is observed peeling off.
B: Two or fewer of 100 squares are observed peeling off.
C: Three to ten of 100 squares are observed peeling off.
D: Ten or more of 100 squares are observed peeling off.
(Evaluation of Surface Resistance)

The surface on the antireflective film's low refractive index layer side (outermost layer) is examined for surface resistance by using an ultrahigh-insulation-resistance/micro ammeter, TR8601 (made by ADVANTEST Corporation) under a 25° C.-60% RH condition.

The surface resistance value is represented by log SR (logarithm), with the value expressed in the unit Ω/square being taken as SR. Sufficient antistatic properties can be ensured so long as the value of log SR is 11.0 or below.

Example 1

Antireflective film Samples 101 to 107 having the compositions shown in Table 1 were made, and evaluated by the methods described above.

TABLE 1

| Sample | Hard Coating Layer | Conductive Layer | | Low Refractive Index Layer | Integrated Reflectance (%) | logSR | Adhesion | Steel Wool Abrasion Resistance | note |
|---|---|---|---|---|---|---|---|---|---|
| | | Transparent Conductive Layer | Cross-linking Site-Forming Compound (Amount added) | | | | | | |
| 101 | H-1 | C-1 | X-1 (6.4 g) | L-1 | 2.6 | 10.3 | B | 3 | Invention |
| 102 | " | " | X-2 (6.4 g) | " | 2.6 | 10.2 | B | 3 | Invention |
| 103 | " | " | X-5 (6.4 g) | " | 2.6 | 10.3 | A | 4 | Invention |
| 104 | " | " | X-8 (7.1 g) | " | 2.6 | 10.2 | A | 5 | Invention |
| 105 | " | " | nothing | " | 2.6 | 10.3 | D | 1 | Comparative Example |
| 106 | nothing | " | nothing | " | 2.6 | 10.3 | D | 1 | Comparative Example |
| 107 | nothing | " | X-5 (6.4 g) | " | 2.6 | 10.3 | B | 3 | Invention |

The antireflective films according to the invention were able to have sufficient surface resistance values by effects of the transparent conductive material, and delivered excellent adhesion and steel wool abrasion resistance by effects of the cross-linking site-forming compounds. The surface resistance value in the comparative example was equivalent to those in the invention, but adhesion and steel wool abrasion resistance were clearly inferior to those in the invention.

Example 2

Antireflective film Samples 201 to 205 having the compositions shown in Table 2 were made, and evaluated by the methods described above.

TABLE 2

| Sample | Hard Coating Layer | Conductive Layer | | Low Refractive Index Layer | Integrated Reflectance (%) | logSR | Adhesion | Steel Wool Abrasion Resistance | note |
|---|---|---|---|---|---|---|---|---|---|
| | | Transparent Conductive Layer | Cross-linking Site-Forming Compound (Amount added) | | | | | | |
| 201 | H-2 | C-1 | X-1 (6.4 g) | L-2 | 1.4 | 9.8 | B | 3 | Invention |
| 202 | " | C-2 | X-1 (6.4 g) | " | 1.4 | 9.8 | A | 4 | Invention |
| 203 | " | C-3 | X-1 (6.4 g) | " | 1.4 | 9.8 | A | 4 | Invention |
| 204 | " | " | X-8 (7.1 g) | " | 1.4 | 9.8 | A | 5 | Invention |

TABLE 2-continued

| | | Conductive Layer | | | | | | | |
|---|---|---|---|---|---|---|---|---|---|
| Sample | Hard Coating Layer | Transparent Conductive Layer | Cross-linking Site-Forming Compound (Amount added) | Low Refractive Index Layer | Integrated Reflectance (%) | logSR | Adhesion | Steel Wool Abrasion Resistance | note |
| 205 | " | " | nothing | " | 1.4 | 10 | D | 1 | Comparative Example |

The antireflective films according to the invention were able to have sufficient surface resistance values by effects of the transparent conductive materials, and delivered excellent adhesion and steel wool abrasion resistance by effects of the cross-linking site-forming compounds. The samples 202 to 204 in particular, wherein the polymer dopants having non-ionic functional groups were used, made further improvements in adhesion and steel wool abrasion resistance. These improvements are thought to be attributable to increases in densities of cross-linking sites inside the conductive layer and for interface adhesion between the conductive layer and its adjacent layer.

Example 3

Antireflective film Samples 301 to 303 having the compositions shown in Table 3 were made, and evaluated by the methods described above. As to the conditions for curing the low refractive index layers used in the present example, however, 10 minutes' heating at 110° C. was not conducted.

TABLE 3

| | | Conductive Layer | | | | | | | |
|---|---|---|---|---|---|---|---|---|---|
| Sample | Hard Coating Layer | Transparent Conductive Layer | Cross-linking Site-Forming Compound (Amount added) | Low Refractive Index Layer | Integrated Reflectance (%) | logSR | Adhesion | Steel Wool Abrasion Resistance | note |
| 301 | H-3 | C-1 | Oligomer a-1 (23.5 g) | L-3 | 1.3 | 9.8 | A | 5 | Invention |
| 302 | " | " | Oligomer a-2 (22.0 g) | " | 1.3 | 9.8 | A | 5 | Invention |
| 303 | " | " | nothing | " | 1.3 | 9.9 | D | 1 | Comparative Example |

The samples 301 and 302, which each used as the cross-linking site-forming compound the oligomer sol formed from a mixture of the compounds represented by formulae (1) and (2) according to the invention, were able to have sufficient surface resistance values by effects of the transparent conductive material, and rated highest in adhesion and steel wool abrasion resistance. As a reason for this, it is thought that the hardness of the conductive layer was heightened by increases in densities of cross-linking sites inside the conductive layer and for interface adhesion between the conductive layer and its adjacent layer and further by formation of cross-linked structures via oligomers.

Example 4

Antireflective film Samples 401 to 406 having the compositions shown in Table 4 were made, and evaluated by the methods described above. As to the conditions for curing the low refractive index layers used in the present example, however, 10 minutes' heating at 110° C. was changed to 3 minutes' heating at 120° C.

TABLE 4

| | | Conductive Layer | | | | | | | |
|---|---|---|---|---|---|---|---|---|---|
| Sample | Hard Coating Layer | Transparent Conductive Layer | Cross-linking Site-Forming Compound (Amount added) | Low Refractive Index Layer | Integrated Reflectance (%) | logSR | Adhesion | Steel Wool Abrasion Resistance | note |
| 401 | H-3 | C-1 | Oligomer a-1 (23.5 g) | L-4 | 1.4 | 9.8 | A | 5 | Invention |

TABLE 4-continued

| | | Conductive Layer | | | | | | | |
|---|---|---|---|---|---|---|---|---|---|
| Sample | Hard Coating Layer | Transparent Conductive Layer | Cross-linking Site-Forming Compound (Amount added) | Low Refractive Index Layer | Integrated Reflectance (%) | logSR | Adhesion | Steel Wool Abrasion Resistance | note |
| 402 | " | " | Oligomer a-2 (22.0 g) | " | 1.4 | 9.8 | A | 5 | Invention |
| 403 | " | " | X-1 (6.4 g) | " | 1.4 | 9.8 | B | 3 | Invention |
| 404 | " | " | X-2 (6.4 g) | " | 1.4 | 9.8 | B | 3 | Invention |
| 405 | " | " | X-5 (6.4 g) | " | 1.4 | 9.8 | A | 4 | Invention |
| 406 | " | " | X-8 (7.1 g) | " | 1.4 | 9.7 | A | 5 | Invention |

All the samples 401 to 406 according to the invention were able to have sufficient surface resistance values by effects of the transparent conductive material, and delivered excellent adhesion and steel wool abrasion resistance by effects of the cross-linking site-forming compounds.

Example 5

(Preparation of Fine-Particle Titanium Dioxide Dispersion)

As the fine-particle titanium dioxide, fine particles of titanium dioxide that contained cobalt and had undergone surface treatment with aluminum hydroxide and zirconium hydroxide (MPT-129C, a product of Ishihara Sangyo Kaisha Ltd., $TiO_2:Co_3O_4:Al_2O_3:ZrO_2=90.5:3.0:4.0:0.5$ by weight) were used.

These particles in an amount of 257.1 parts by mass were admixed with 41.1 parts by mass of Dispersant A illustrated below and 701.8 parts by mass of cyclohexanone, and dispersed by means of a Dynomill, thereby preparing a titanium dioxide dispersion having a weight-average particle size of 70 nm.

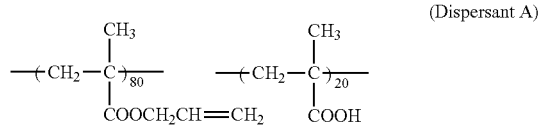

(Dispersant A)

(Preparation of Coating Solution M-1 for Middle Refractive Index Layer)

To 99.1 parts by mass of the foregoing titanium dioxide dispersion, 68.0 parts by mass of a dipentaerythritol pentaacrylate-dipentaerythritol hexaacrylate mixture (DPHA), 3.6 parts by mass of a photopolymerization initiator (IRGACURE 907), 1.2 parts by mass of a photosensitizer (KAYACURE DETX, a product of Nippon Kayaku Co., Ltd.), 279.6 parts by mass of methyl ethyl ketone and 1049.0 parts by mass of cyclohexanone were added and stirred. After thorough stirring, the resultant mixture was filtered through a polypropylene filter having a pore size of 0.4 μm, thereby preparing a coating Solution M-1 for a middle refractive index layer.

(Preparation of Coating Solution H-1 for High Refractive Index Layer)

To 469.8 parts by mass of the foregoing titanium dioxide dispersion, 40.0 parts by mass of a dipentaerythritol pentaacrylate-dipentaerythritol hexaacrylate mixture (DPHA, a product of Nippon Kayaku Co., Ltd.), 3.3 parts by mass of a photopolymerization initiator (IRGACURE 907, a product of Ciba Specialty Chemicals Inc.), 1.1 parts by mass of a photosensitizer (KAYACURE DETX, a product of Nippon Kayaku Co., Ltd.), 526.2 parts by mass of methyl ethyl ketone and 459.6 parts by mass of cyclohexanone were added and stirred. The resultant mixture was filtered through a polypropylene filter having a pore size of 0.4 μm, thereby preparing a coating Solution H-1 for a high refractive index layer.

(Preparation of Coating Solution L-5 for Low Refractive Index Layer)

The following Copolymer B according to the invention was dissolved in methyl isobutyl ketone so as to have a concentration of 7 mass %, and thereto were added a silicone resin having methacrylate groups as its ends, X-22-164C (a product of Shin-Etsu Chemical Co., Ltd.), in a proportion of 3 mass % to the solid content and a photoradical generator, IRGACURE 907 (trade name), in a proportion of 5 mass % to the solid content. Thus, a coating Solution L-5 for a low refractive index layer was prepared.

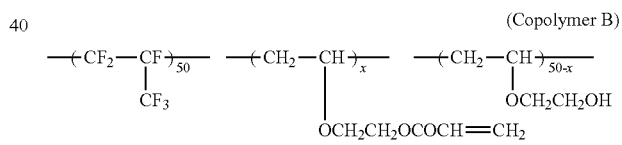

(Copolymer B)

$x \geq 40$ (Making of Antireflective Film)

To a 80-μm-thick triacetyl cellulose film (TS-80UF, a product of FUJIFILM Corporation), the coating solution for a hard coating layer and the coating solution for a conductive layer as shown in Table 5 were applied in order of mention by using a coater having a slot die in accordance with the same method as in Examples 1 to 4.

Further thereon, the coating solution for a middle refractive index layer, the coating solution for a high refractive index layer and the coating solution for a low refractive index layer were put in succession by means of a gravure coater having three coating stations.

The coat for a middle refractive index layer was dried under conditions that the temperature setting was 90° C. and the time setting was 30 seconds, and cured by UV irradiation under conditions that a 180 W/cm air-cooled metal halide lamp (made by Eye Graphics Co., Ltd.) was used in illumination of 400 mW/cm², in an exposure amount of 400 mJ/cm² and in an atmosphere with an oxygen concentration reduced to at most 1.0 vol % by purge with nitrogen. The middle refractive index layer after the curing had a refractive index of 1.630 and a thickness of 67 nm.

The coat for a high refractive index layer was dried under conditions that the temperature setting was 90° C. and the time setting was 30 seconds, and cured by UV irradiation under conditions that a 240 W/cm air-cooled metal halide lamp (made by Eye Graphics Co., Ltd.) was used in illumination of 600 mW/cm$^2$, in an exposure amount of 400 mJ/cm$^2$ and in an atmosphere with an oxygen concentration reduced to at most 1.0 vol % by purge with nitrogen. The high refractive index layer after the curing had a refractive index of 1.905 and a thickness of 107 nm.

The coat for a low refractive index layer was dried under conditions that the temperature setting was 90° C. and the time setting was 30 seconds, and cured by UV irradiation under conditions that a 240 W/cm air-cooled metal halide lamp (made by Eye Graphics Co., Ltd.) was used in illumination of 600 mW/cm$^2$, in an exposure amount of 600 mJ/cm$^2$ and in an atmosphere with an oxygen concentration reduced to at most 1.0 vol % by purge with nitrogen. The low refractive index layer after the curing had a refractive index of 1.440 and a thickness of 85 nm. In this manner, an antireflective film was made.

As a result of evaluating TN-, IPS-, VA- and OCB-mode transmission liquid crystal display devices which were each fitted with the polarizing plate made in accordance with the invention, it was ascertained that the present polarizing plate allowed the making of display devices having excellent viewability, dust resistance and abrasion resistance.

<Liquid Crystal Display Device>
(TN-Mode Liquid Crystal Display Device)

TN-mode liquid crystal display with 20-inch diagonal screen: Instead of the polarizing plate provided on the viewer side of the model TH-20TA3 (made by Matsushita Electric Industrial Co., Ltd.), one polarizing plate according to the invention (made from Sample 104 in Example 1) was stuck with a pressure-sensitive adhesive of acrylic type so that its optically-anisotropic layer was situated on the liquid crystal cell's side.

(OBC-Mode Liquid Crystal Display Device)

To the viewer's-side outermost surface of each of the OCB-mode liquid crystal display devices disclosed in Examples 10, 15, 18 and 19 of JP-A-2000-154261, the present Sample 301 made in Example 3 was stuck with an adhesive of polyvinyl alcohol type.

TABLE 5

| Sample | Hard Coating Layer | Conductive Layer Transparent Conductive Material | Cross-linking Site-Forming Compound (Amount added) | Middle refractive index layer | High Refractive Index Layer | Low Refractive Index Layer | Integrated Reflection Rate (%) | logSR | Adhesion | Steel Wool Abrasion Resistance | note |
|---|---|---|---|---|---|---|---|---|---|---|---|
| 501 | H-4 | C-1 | Oligomer a-1 (23.5 g) | M-1 | H-1 | L-5 | 0.45 | 10.2 | A | 5 | Invention |
| 502 | " | " | Oligomer a-2 (22.0 g) | " | " | " | 0.45 | 10.2 | A | 5 | Invention |
| 503 | " | " | X-1 (6.4 g) | " | " | " | 0.45 | 10.3 | B | 3 | Invention |
| 504 | " | " | X-2 (6.4 g) | " | " | " | 0.45 | 10.2 | B | 3 | Invention |
| 505 | " | " | X-5 (6.4 g) | " | " | " | 0.45 | 10.1 | A | 4 | Invention |
| 506 | " | " | X-8 (7.1 g) | " | " | " | 0.45 | 10.2 | A | 5 | Invention |

Example 6

(Saponification Treatment of Antireflective Film)

The back of each of the antireflective film samples prepared in Examples 1, 2, 3, 4 and 5 was saponification-treated under the conditions described below.

Alkali bath: 1.5 mol/dm$^3$ of NaOH solution, 55° C.-120 sec
Fist washing bath: Tap water, 60 sec
Neutralizing bath: 0.05 mol/dm$^3$ of Sulfuric acid, 30° C.-20 sec
Second washing bath: Tap water, 60 sec
Drying: 120° C., 60 sec (Making of Polarizing Plate with Antireflective Film)

Iodine was adsorbed to a stretched polyvinyl alcohol film, thereby making a polarizer. To one side of the polarizer, the saponification-treated antireflective film was stuck with an adhesive of polyvinyl alcohol type so that the substrate (triacetyl cellulose) of the antireflective film faced the polarizer. A viewing angle increasing film having an optically-compensatory layer, Wide View Film SA12B (made by FUJIFILM Corporation), was saponification-treated, and then stuck to the other side of the polarizer with an adhesive of polyvinyl alcohol type. In this manner, a polarizing plate was made.

(VA-Mode Liquid Crystal Display Device)

VA-mode liquid crystal display with 22-inch diagonal screen: Instead of the surface protective film provided on the viewer side of the model TH22-LH10 (made by Matsushita Electric Industrial Co., Ltd.), the present Sample 204 made in Example 2 was laminated.

(IPS-Mode Liquid Crystal Display Device)

IPS-mode liquid crystal display with 22-inch diagonal screen: Instead of the surface protective film provided on the viewer side of the model W20-LC3000 (made by Hitachi, Ltd.), the present Sample 402 made in Example 4 was laminated.

(Organic EL)

To the glass plate mounted on the surface of an organic EL display device, the present Sample 405 made in Example 4 was stuck with a pressure-sensitive adhesive.

Example 7

(Thin TAC)

A sample was prepared in the same manner as Sample 401 in Example 4, except that the thickness of the substrate was changed to 40 μm. As a result of performing evaluations by the same methods as in Example 4, it was ascertained that the antireflective film reduced in curling and excellent in abrasion resistance and dust resistance was obtained.

Example 8

(Coating on PET)

Evaluations were made using as substrates of antireflective films commercially available optical PET films with easily-adhering layers, COSMOSHINE A4100 and A4300, products of Toyobo Co., Ltd., and the same results as mentioned above were obtained.

(PDP Image Display Device)

An antireflective film was made in the same manner as Sample 501 in Example 5, except that PET with an easily-adhering layer (COSMOSHINE A4100 made by Toyobo Co., Ltd.; thickness: 188 μm) was used as the transparent substrate. The surface film was peeled off a 42-inch plasma display devoid of a front plate (direct color-film system PDU-42H6A1 made by Pioneer Corporation), and in place thereof the present antireflective film was stuck with a pressure-sensitive adhesive. As a result of performing evaluations on the plasma display device fitted with the present antireflective film, it was ascertained that the display device having excellent viewability, dust resistance and abrasion resistance was capable of being made.

This application claims foreign priority from Japanese Patent Application No. 2006-316146, filed Nov. 22, 2006, the entire disclosure of which is herein incorporated by reference.

What is claimed is:

1. An antireflective film comprising:
   a transparent substrate;
   a conductive layer formed from a composition including a transparent conductive polymeric material and a compound forming a cross-linking site, the compound having a plurality of cross-linking reactive groups, at least one of which cross-links with the transparent conductive polymeric material; and
   a low refractive index layer;
   wherein the transparent conductive polymeric material is a complex of a π-conjugated conductive polymer and a polymer dopant;
   wherein the compound forming a cross-linking site has a group cross-linking with the polymer dopant;
   wherein the compound forming a cross-linking site is one of a compound or an oligomer, each having two groups: a group capable of cross-linking with the polymer dopant and a cross-linking reactive group having an ethylenically unsaturated double bond;
   wherein the compound forming a cross-linking site is at least one of: a hydrolysate of a mixture of a compound represented by formula (1) and a compound represented by formula (2); and a condensate of the hydrolysate:

$$(R^1)_m\text{-}M^1\text{-}(OR^3)_n \tag{1}$$

$$(R^2)_p\text{-}M^2\text{-}(OR^4)_q \tag{2}$$

wherein $R^1$ is a group having as a partial structure a group cross-linking with the polymer dopant, $R^3$s are the same or different and each is an alkyl group or a haloalkyl group, n is 1 or above, m is 1 or above, $M^1$ is silicon, aluminum, zirconium, titanium, tin or antimony, $R^2$ is a group having as a partial structure an ethylenically unsaturated double bond, $R^2$ is different from $R^1$, $R^4$s are the same or different and each is an alkyl group or a haloalkyl group, p is 1 or above, q is 1 or above, and $M^2$ is a silicon, aluminum, zirconium, titanium, tin or antimony; and wherein an amount of the compound forming a cross-linking site is 0.05 to 1.0 g/m².

2. The antireflective film of claim 1, further comprising at least one layer of a hard coating layer and an antiglare layer between the transparent substrate and the conductive layer.

3. The antireflective film of claim 1, wherein the polymer dopant has at least one anionic group and at least one non-anionic group.

4. The antireflective film of claim 1, further comprising: a middle refractive index layer and a high refractive index layer between the conductive layer and the low refractive index layer, wherein the middle refractive index layer, the high refractive index layer and the low refractive index layer are arranged in increasing order of distance from the transparent substrate, the middle refractive index layer has a refractive index of 1.5 to 1.7, the high refractive index layer has a refractive index of 1.7 to 2.1, and the low refractive index layer has a refractive index of 1.3 to 1.5.

5. A polarizing plate comprising: a polarizer; and two protective films sandwiching the polarizer therebetween, at least one of the two protective films being an antireflective film of claim 1.

6. An image display device comprising a polarizing plate of claim 5.

7. The antireflective film of claim 1, wherein the group capable of cross-linking with the polymer dopant is a group capable of cross-linking with one of a sulfo group, a carboxyl group, a hydroxyl group, or an amino group of a polyanion dopant.

* * * * *